US012672050B2

(12) United States Patent
Hoshino et al.

(10) Patent No.: US 12,672,050 B2
(45) Date of Patent: Jun. 30, 2026

(54) USER EQUIPMENT, BASE STATION, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Masayuki Hoshino, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 18/501,447

(22) Filed: Nov. 3, 2023

(65) Prior Publication Data

US 2024/0107428 A1     Mar. 28, 2024

Related U.S. Application Data

(63) Continuation of application No. PCT/JP2022/019438, filed on Apr. 28, 2022.

(30) Foreign Application Priority Data

May 7, 2021     (JP) ................................. 2021-079360

(51) Int. Cl.
*H04W 48/12* (2009.01)
*H04W 72/232* (2023.01)

(52) U.S. Cl.
CPC ......... *H04W 48/12* (2013.01); *H04W 72/232* (2023.01)

(58) Field of Classification Search
CPC ............... H04W 48/12; H04W 72/232; H04W 36/00692; H04W 52/0216; H04L 5/0053; H04L 5/0096; H04L 5/001; Y02D 30/70
See application file for complete search history.

(56) References Cited

U.S. PATENT DOCUMENTS

| 11,330,577 B2 * | 5/2022 | Hosseini | ............... H04W 72/23 |
| 11,690,087 B2 * | 6/2023 | Xu | .................... H04W 72/0446 |
| | | | 370/329 |

(Continued)

FOREIGN PATENT DOCUMENTS

| WO | WO-2019099533 A1 * | 5/2019 | ............. H04W 72/23 |
| WO | WO-2020029955 A1 * | 2/2020 | ........... H04L 5/0053 |

(Continued)

OTHER PUBLICATIONS

Ericsson, "Design of Active Time Power Savings Mechanisms", Document R1-2101558, 3GPP TSG RAN WG1 #104-e, Jan. 25-Feb. 5, 2021.

(Continued)

*Primary Examiner* — Michael A Keller
(74) *Attorney, Agent, or Firm* — Harness, Dickey & Pierce, PLC

(57) ABSTRACT

A user equipment 100 to which a plurality of cell groups are configured by a base station 200, comprises the steps of: receiving a switching instruction for giving an instruction about switching of search space set groups (SSSGs) in serving cells belonging to any cell group of the plurality of cell groups from the base station 200; specifying a target cell group as a switching target of the SSSG from among the plurality of cell groups based on a cell identifier or a cell group identifier included in the switching instruction. The UE 100 is configured to simultaneously switch the SSSGs of all the serving cells in the specified target cell group in response to the reception of the switching instruction.

9 Claims, 22 Drawing Sheets

(56) References Cited

U.S. PATENT DOCUMENTS

| | | | |
|---|---|---|---|
| 11,864,186 B2 * | 1/2024 | Zhou | H04L 5/001 |
| 12,082,244 B2 * | 9/2024 | Sun | H04W 72/23 |
| 2016/0056933 A1 * | 2/2016 | Aiba | H04L 1/1861 |
| | | | 370/329 |
| 2018/0279327 A1 * | 9/2018 | Ying | H04W 72/0446 |
| 2019/0223162 A1 * | 7/2019 | Suzuki | H04W 76/28 |
| 2021/0045147 A1 | 2/2021 | Zhou et al. | |
| 2021/0136771 A1 * | 5/2021 | Xu | H04W 72/0453 |
| 2022/0150946 A1 * | 5/2022 | Tsai | H04W 76/28 |
| 2022/0322314 A1 * | 10/2022 | Rastegardoost | H04W 72/23 |
| 2022/0338038 A1 * | 10/2022 | Lai | H04W 72/23 |
| 2022/0338120 A1 * | 10/2022 | Ma | H04W 72/23 |
| 2022/0346123 A1 * | 10/2022 | Niu | H04W 72/23 |
| 2022/0394520 A1 * | 12/2022 | Shokri Razaghi | |
| | | | H04W 74/0816 |
| 2024/0072975 A1 * | 2/2024 | Rastegardoost | H04W 72/20 |
| 2024/0155636 A1 * | 5/2024 | Chatterjee | H04L 27/2602 |
| 2024/0178973 A1 * | 5/2024 | Li | H04L 5/0053 |

FOREIGN PATENT DOCUMENTS

| | | | | |
|---|---|---|---|---|
| WO | WO-2020065624 A1 * | 4/2020 | | H04L 5/0094 |
| WO | WO-2020246858 A1 * | 12/2020 | | H04W 72/23 |
| WO | WO-2021048581 A1 * | 3/2021 | | H04L 5/0053 |
| WO | WO-2021147795 A1 * | 7/2021 | | H04W 72/20 |
| WO | WO-2022042752 A1 * | 3/2022 | | H04W 76/28 |

OTHER PUBLICATIONS

Qualcomm Incorporated, "DCI-based Power Saving Adaptation During DRX Active Time", Document R1-2104684, 3GPP TSG-RAN WG1 #105-e, May 10-27, 2021.

RP-200938, 3GPP TSG RAN meeting #88e, Electronic Meeting, Jun. 29-Jul. 3, 2020, pp. 1-5.

R1-2100170 (Oppo), 3GPP TSG RAN WG1 #104-e, e-Meeting, Jan. 25-Feb. 5, 2021, pp. 1-7.

R1-2100593 (MediaTek), 3GPP TSG RAN WG1 #104-e, e-Meeting, Jan. 25-Feb. 5, 2021, pp. 1-8.

R1-2101476 (Qualcomm), 3GPP TSG-RAN WG1 #104-e, e-Meeting, Jan. 25-Feb. 5, 2021, pp. 1-4.

3GPP TS 38.213 V16.5.0, 3rd Generation Partnership Project; Technical Specification Group Radio Access Network; NR; Physical layer procedures for control (Release 16), (Mar. 2021), pp. 1-183.

* cited by examiner

BASE STATION

210

COMMUNICATOR

230

CONTROLLER

220

NETWORK
INTERFACE

START

RECEIVE UPLINK SCHEDULING DCI AS SWITCHING INSTRUCTION    S201

TRANSMIT UPLINK DATA TO BASE STATION    S202

ACTIVATE UPLINK HARQ RTT TIMER    S203

DOES UPLINK HARQ RTT TIMER EXPIRE?    S204

NO

YES

ACTIVATE UPLINK RETRANSMISSION TIMER    S205

DOES UPLINK RETRANSMISSION TIMER EXPIRE?    S206

NO

YES

START SWITCHING    S207

END

START

S301
PERFORM PREDETERMINED CONTROL ON SRS TRANSMISSION TO BASE STATION, CSI MEASUREMENT, AND CSI REPORT TO BASE STATION

S302
RECEIVE SWITCHING INSTRUCTION DCI FROM BASE STATION

S303
PERFORM CONTROL DIFFERENT FROM PREDETERMINED CONTROL ON SRS TRANSMISSION TO BASE STATION, CSI MEASUREMENT, AND CSI REPORT TO BASE STATION

END

FIG. 16

PDCCH-Config information element

```
-- ASN1START
-- TAG-PDCCH-CONFIG-START

PDCCH-Config ::=          SEQUENCE {
controlResourceSetToAddModList          SEQUENCE(SIZE (1..3)) OF ControlResourceSet          OPTIONAL,     -- Need N
controlResourceSetToReleaseList          SEQUENCE(SIZE (1..3)) OF ControlResourceSetId          OPTIONAL,     -- Need N
searchSpacesToAddModList          SEQUENCE(SIZE (1..10)) OF SearchSpace          OPTIONAL,     -- Need N
searchSpacesToReleaseList          SEQUENCE(SIZE (1..10)) OF SearchSpaceId          OPTIONAL,     -- Need N
downlinkPreemption          SetupRelease { DownlinkPreemption }          OPTIONAL,     -- Need M
tpc-PUSCH          SetupRelease { PUSCH-TPC-CommandConfig }          OPTIONAL,     -- Need M
tpc-PUCCH          SetupRelease { PUCCH-TPC-CommandConfig }          OPTIONAL,     -- Need M
tpc-SRS          SetupRelease { SRS-TPC-CommandConfig }          OPTIONAL,     -- Need M
...,
controlResourceSetToAddModListSizeExt-r16 SEQUENCE (SIZE (1..2)) OF ControlResourceSet          OPTIONAL,     -- Need N
controlResourceSetToReleaseListSizeExt-r16 SEQUENCE (SIZE (1..5)) OF ControlResourceSetId-r16          OPTIONAL,     -- Need N
searchSpacesToAddModListExt-r16          SEQUENCE(SIZE (1..10)) OF SearchSpaceExt-r16          OPTIONAL,     -- Need N
uplinkCancellation-r16          SetupRelease { UplinkCancellation-r16 }          OPTIONAL,     -- Need M
monitoringCapabilityConfig-r16          ENUMERATED { r15monitoringcapability, r16monitoringcapability } OPTIONAL,     -- Need M
searchSpaceSwitchConfig-r16          SearchSpaceSwitchConfig-r16          OPTIONAL,     -- Need R
...,
[[
searchSpaceSetToAddModList-r17          SEQUENCE (SIZE (1..maxNrofSearchSpaceSets-r17)) OF SearchSpaceSet-r17          OPTIONAL,     -- Need N
searchSpaceSetToReleaseList-r17          SEQUENCE (SIZE (1..maxNrofSearchSpaceSets-r17)) OF SearchSpaceSetId-r17          OPTIONAL,     -- Need N
]]
}

SearchSpaceSwitchConfig-r16 ::=          SEQUENCE {
cellGroupsForSwitchList-r16          SEQUENCE(SIZE (1..4)) OF CellGroupForSwitch-r16          OPTIONAL,     -- Need R
searchSpaceSwitchDelay-r16          INTEGER (10..52)          OPTIONAL,     -- Need R
}

CellGroupForSwitch-r16 ::=          SEQUENCE(SIZE (1..16)) OF ServCellIndex

-- TAG-PDCCH-CONFIG-STOP
-- ASN1STOP
```

FIG. 17

```
SearchSpaceSet information element

-- ASN1START
-- TAG-SEARCHSPACESET-START

SearchSpaceSet-r17 ::=          SEQUENCE {
searchSpaceSetId-r17           SearchSpaceSetId-r17,
searchSpaces-r17               SEQUENCE (SIZE (0..maxNrofSearchSpaces-r17)) OF SearchSpaceId
    ...
}

-- TAG-SEARCHSPACESET-STOP
-- ASN1STOP
```

```
SearchSpaceSetId information element

-- ASN1START
-- TAG-SEARCHSPACESETID-START

SearchSpaceSetId-r17 ::=        INTEGER (0..maxNrofSearchSpaceSets-1-r17)

-- TAG-SEARCHSPACESETID-STOP
-- ASN1STOP
```

FIG. 18

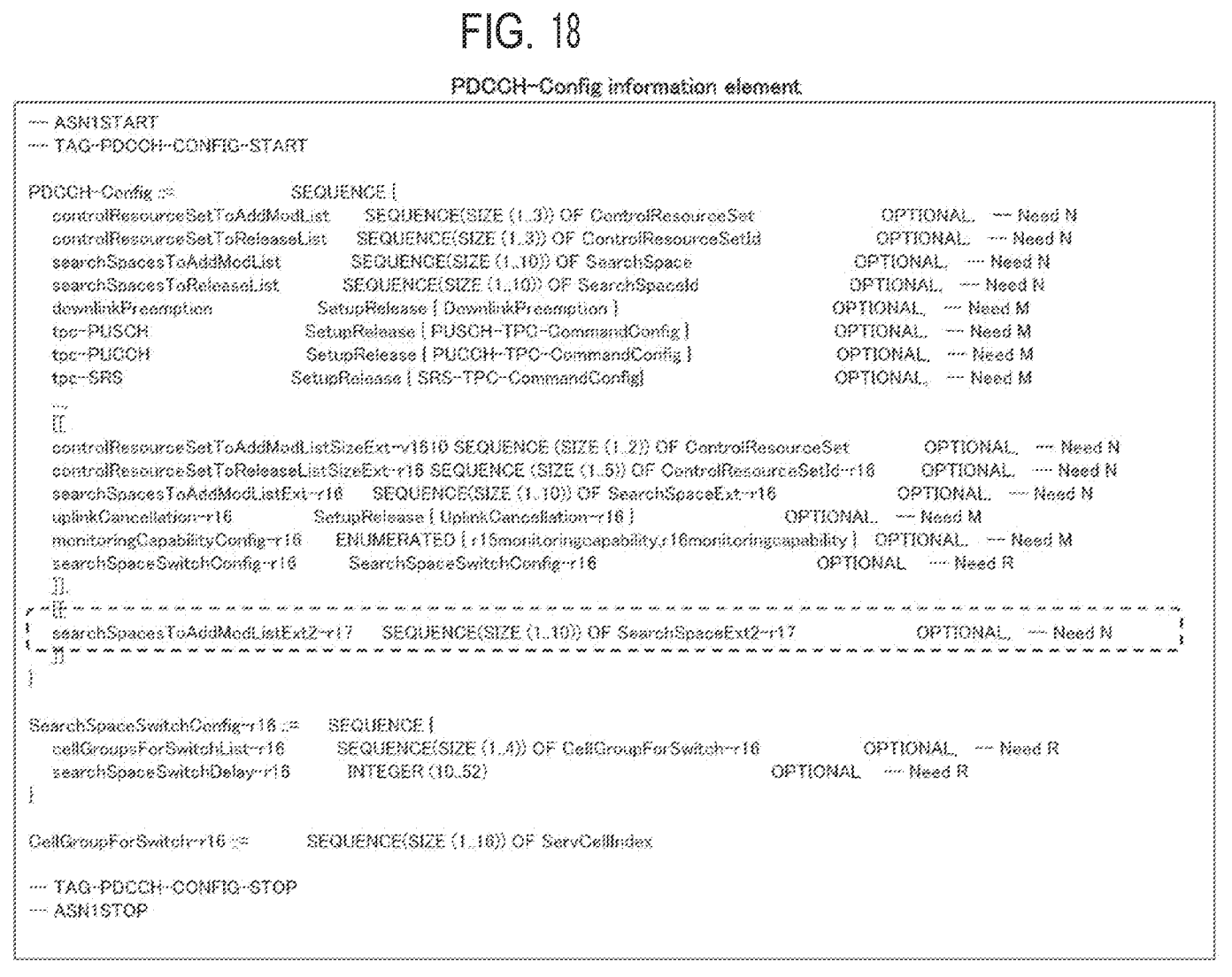

PDCCH-Config information element

```
-- ASN1START
-- TAG-PDCCH-CONFIG-START

PDCCH-Config ::=                        SEQUENCE {
controlResourceSetToAddModList          SEQUENCE(SIZE (1..3)) OF ControlResourceSet           OPTIONAL,  -- Need N
controlResourceSetToReleaseList         SEQUENCE(SIZE (1..3)) OF ControlResourceSetId         OPTIONAL,  -- Need N
searchSpacesToAddModList                SEQUENCE(SIZE (1..10)) OF SearchSpace                 OPTIONAL,  -- Need N
searchSpacesToReleaseList               SEQUENCE (1..10)) OF SearchSpaceId                    OPTIONAL,  -- Need N
downlinkPreemption                      SetupRelease { DownlinkPreemption }                   OPTIONAL,  -- Need M
tpc-PUSCH                               SetupRelease { PUSCH-TPC-CommandConfig }              OPTIONAL,  -- Need M
tpc-PUCCH                               SetupRelease { PUCCH-TPC-CommandConfig }              OPTIONAL,  -- Need M
tpc-SRS                                 SetupRelease { SRS-TPC-CommandConfig}                 OPTIONAL,  -- Need M

...
]]

controlResourceSetToAddModListSizeExt-r16 SEQUENCE (SIZE (1..2)) OF ControlResourceSet       OPTIONAL,  -- Need N
controlResourceSetToReleaseListSizeExt-r16 SEQUENCE (SIZE (1..5)) OF ControlResourceSetId-r16 OPTIONAL, -- Need N
searchSpacesToAddModListExt-r16         SEQUENCE (1..10)) OF SearchSpaceExt-r16              OPTIONAL,  -- Need N
uplinkCancellation-r16                  SetupRelease { UplinkCancellation-r16 }              OPTIONAL,  -- Need M
monitoringCapabilityConfig-r16          ENUMERATED { r15monitoringcapability,r16monitoringcapability } OPTIONAL, -- Need M
searchSpaceSwitchConfig-r16             SearchSpaceSwitchConfig-r16                          OPTIONAL,  -- Need R
]],

[[
searchSpacesToAddModListExt2-r17        SEQUENCE(SIZE (1..10)) OF SearchSpaceExt2-r17        OPTIONAL,  -- Need N
]]
}

SearchSpaceSwitchConfig-r16 ::=         SEQUENCE {
cellGroupsForSwitchList-r16             SEQUENCE(SIZE (1..4)) OF CellGroupForSwitch-r16       OPTIONAL,  -- Need R
searchSpaceSwitchDelay-r16              INTEGER (10..52)                                     OPTIONAL,  -- Need R
}

CellGroupForSwitch-r16 ::=              SEQUENCE(SIZE (1..16)) OF ServCellIndex

-- TAG-PDCCH-CONFIG-STOP
-- ASN1STOP
```

FIG. 19

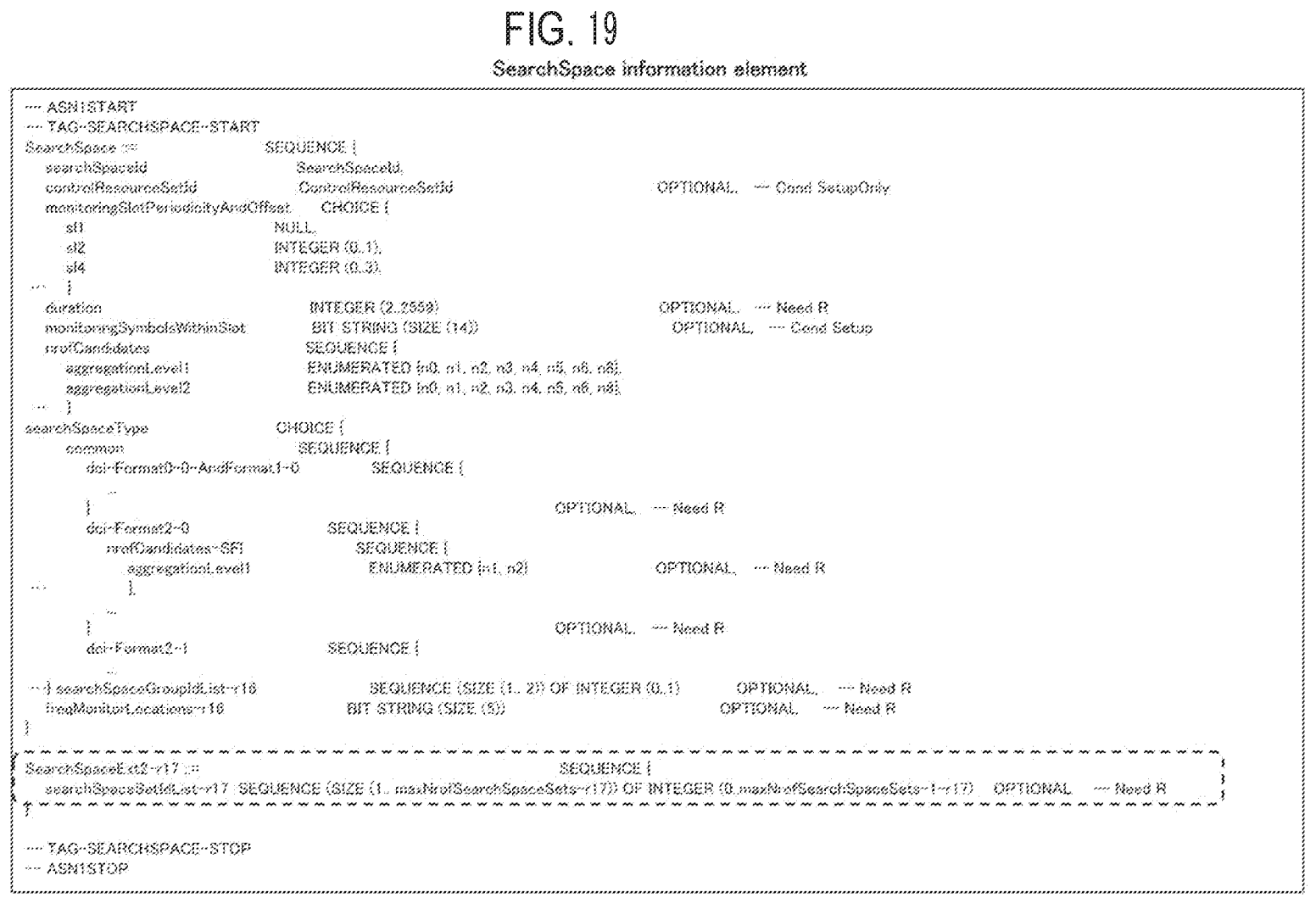

SearchSpace information element

```
-- ASN1START
-- TAG-SEARCHSPACE-START
SearchSpace ::=                    SEQUENCE {
    searchSpaceId                  SearchSpaceId,
    controlResourceSetId           ControlResourceSetId          OPTIONAL,  -- Cond SetupOnly
    monitoringSlotPeriodicityAndOffset    CHOICE {
        sl1                        NULL,
        sl2                        INTEGER (0..1),
        sl4                        INTEGER (0..3),
        ...
    },
    duration                       INTEGER (2..2559)
    monitoringSymbolsWithinSlot    BIT STRING (SIZE (14))                    OPTIONAL,  -- Need R
    nrofCandidates                 SEQUENCE {                                OPTIONAL,  -- Cond Setup
        aggregationLevel1          ENUMERATED {n0, n1, n2, n3, n4, n5, n6, n8},
        aggregationLevel2          ENUMERATED {n0, n1, n2, n3, n4, n5, n6, n8},
        ...
    }
    searchSpaceType                CHOICE {
        common                     SEQUENCE {
            dci-Format0-0-AndFormat1-0   SEQUENCE {
                ...
            }
            dci-Format2-0          SEQUENCE {                                OPTIONAL,  -- Need R
                nrofCandidates-SFI SEQUENCE {
                    aggregationLevel1   ENUMERATED {n1, n2}                  OPTIONAL,  -- Need R
                    ...
                }
            }
            dci-Format2-1          SEQUENCE {                                OPTIONAL,  -- Need R
                ...
            }
        }
    } searchSpaceGroupIdList-r16    SEQUENCE (SIZE (1..2)) OF INTEGER (0..1)  OPTIONAL,  -- Need R
    freqMonitorLocations-r16        BIT STRING (SIZE (5))                     OPTIONAL,  -- Need R
    ...
}
SearchSpaceExt2-r17 ::=            SEQUENCE {
    searchSpaceSetIdList-r17 SEQUENCE (SIZE (1..maxNrofSearchSpaceSets-1r17) OF INTEGER (0..maxNrofSearchSpaceSets-1-r17)  OPTIONAL  -- Need R
    ...
}
-- TAG-SEARCHSPACE-STOP
-- ASN1STOP
```

FIG. 21

USER EQUIPMENT, BASE STATION, AND COMMUNICATION CONTROL METHOD

CROSS-REFERENCE TO RELATED APPLICATIONS

The present application is a continuation application of international Patent Application No. PCT/JP2022/019438, filed on Apr. 28, 2022, which designated the U.S., and claims the benefit of priority of Japanese Patent Application No. 2021-079360, filed on May 7, 2021, the entire contents of which are incorporated herein by reference.

TECHNICAL FIELD

The present disclosure relates to a user equipment, a base station, and a communication control method used in a mobile communication system.

BACKGROUND ART

In recent years, in the 3rd Generation Partnership Project (registered trademark; the same applies hereinafter) (3GPP) which is a standardization project of a mobile communication system, introduction of a power saving technology for reducing power consumption of a user equipment in a radio resource control (RRC) connected state to a 5th generation (5G) system has been studied. For example, a periodicity of a search space corresponding to a candidate timing at which a physical downlink control channel (PDCCH) is allocated is lengthened, and thus, it is possible to reduce power consumption necessary for monitoring the PDCCH.

As such a technology, a technology in which a plurality of search space set groups (SSSGs) including an SSSG having a normal search space periodicity and an SSSG for power saving having a search space periodicity longer than the normal search space periodicity or having no search space are configured to a user equipment and a base station dynamically instructs the user equipment to switch the SSSG has been proposed (see Non Patent Literatures 1 to 3). Accordingly, it is possible to reduce the power consumption of the user equipment while enabling application of an optimal SSSG in accordance with a traffic state of the user equipment.

In addition, there is also a technology of SSSG switching (hereinafter, referred to as "cell group SSSG switching") in which a cell group including a plurality of cells capable of simultaneously switching the SSSG is configured to a user equipment and SSSGs of all the serving cells in the cell group are simultaneously switched.

CITATION LIST

Non Patent Literature

Non Patent Literature 1: 3GPP Contribution R1-2100170 "DCI-based power saving adaptation solutions"
Non Patent Literature 2: 3GPP Contribution R1-2100593 "On enhancements to DCI-based UE power saving during DRX active time"
Non Patent Literature 3: 3GPP Contribution R1-2101476 "DCI-based power saving adaptation during DRX Active Time"

SUMMARY OF INVENTION

In the cell group SSSG switching, the number of cell groups configured to the user equipment is not limited to one, and a plurality of cell groups may be configured to the user equipment. As a result of detailed studies by the inventors, in a case where the user equipment to which the plurality of cell groups are configured receives an SSSG switching instruction from the base station, it is unknown which cell group the SSSGs of the serving cells belong to are to be switched simultaneously, and thus, there is a problem that the cell group SSSG switching cannot be appropriately performed.

Therefore, an object of the present disclosure is to enable appropriate cell group SSSG switching.

In a first aspect, a user equipment to which a plurality of cell groups are configured by a base station, comprises: a communicator configured to receive a switching instruction for giving an instruction about switching of search space set groups (SSSGs) in serving cells belonging to any cell group of the plurality of cell groups from the base station; and a controller configured to specify a target cell group as a switching target of the SSSG from among the plurality of cell groups based on a cell identifier or a cell group identifier included in the switching instruction. The controller is configured to simultaneously switch the SSSGs of all the serving cells in the specified target cell group in response to the reception of the switching instruction.

In a second aspect, a base station that configures a plurality of cell groups to a user equipment, comprises: a communicator configured to transmit, to the user equipment, a switching instruction for giving an instruction about switching of search space set groups (SSSGs) in serving cells belonging to any cell group of the plurality of cell groups.

The communicator is configured to transmit the switching instruction including a cell group identifier of a target cell group as a switching target of the SSSG among the plurality of cell groups or a cell identifier of a serving cell belonging to the target cell group.

In a third aspect, a communication control method executed by a user equipment to which a plurality of cell groups are configured by a base station, comprises the steps of: receiving a switching instruction for giving an instruction about switching of search space set groups (SSSGs) in serving cells belonging to any cell group of the plurality of cell groups from the base station; specifying a target cell group as a switching target of the SSSG from among the plurality of cell groups based on a cell identifier or a cell group identifier included in the switching instruction; and simultaneously switching the SSSGs of all the serving cells in the target cell group specified from among the plurality of cell groups in response to the reception of the switching instruction.

BRIEF DESCRIPTION OF DRAWINGS

The foregoing and other objects, features, and advantages of the present disclosure will become more apparent from the following detailed description with reference to the accompanying drawings. The drawings are as follows.

FIG. 2 is a diagram illustrating a configuration example of a protocol stack according to the embodiment.

FIG. 4 is a diagram for describing the search space and the SSSG switching according to the embodiment.

FIG. 5 is a diagram for describing the search space and the SSSG switching according to the embodiment.

FIG. 7 is a diagram illustrating a configuration of a base station according to the embodiment.

FIG. 16 is a diagram illustrating a first configuration example of an information element included in an RRC message according to the fourth embodiment.

FIG. 17 is a diagram illustrating the first configuration example of the information element included in the RRC message according to the fourth embodiment.

FIG. 18 is a diagram illustrating a second configuration example of the information element included in the RRC message according to the fourth embodiment.

FIG. 19 is a diagram illustrating the second configuration example of the information element included in the RRC message according to the fourth embodiment.

FIG. 21 is a diagram illustrating Specific Example 1 of an operation using a switching timer according to the fifth embodiment.

DESCRIPTION OF EMBODIMENTS

Figure 1:
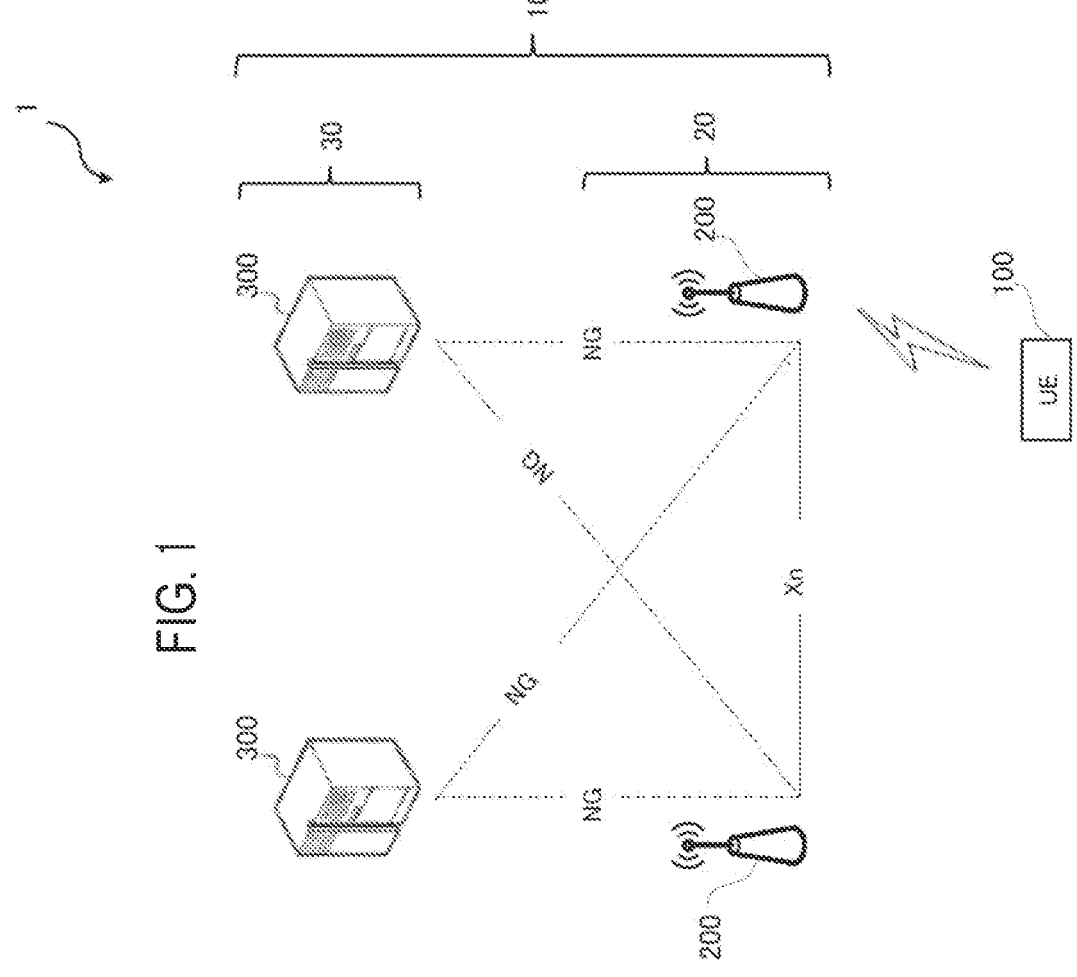
FIG. 1 is a diagram illustrating a configuration of a mobile communication system according to an embodiment.

With reference to the drawings, a mobile communication system according to an embodiment is described. In the description of the drawings, identical or similar parts are marked with identical or similar reference numerals.

First Embodiment (System Configuration)

First, a configuration of a mobile communication system 1 according to the present embodiment will be described with reference to FIG. 1. The mobile communication system 1 is, for example, a system conforming to a technical specification (TS) of 3GPP. Hereinafter, as the mobile communication system 1, a description will be given, as an example, as to a fifth generation system (5th generation system: 5GS) of the 3GPP standard, that is, a mobile communication system based on new radio (NR).

The mobile communication system 1 includes a network 10 and a user equipment (UE) 100 that communicates with the network 10. The network 10 includes a next generation radio access network (NG-RAN) 20, which is a 5G radio access network, and a 5G core network (5GC) 30, which is a 5G core network.

The UE 100 is an equipment used by a user. The UE 100 is, for example, a mobile apparatus such as a mobile phone terminal such as a smartphone, a tablet terminal, a notebook PC, a communication module, or a communication card. The UE 100 may be a vehicle (for example, a car, a train, or the like) or a device provided in the vehicle. The UE 100 may be a transport body other than a vehicle (for example, a ship, an airplane, or the like) or a device provided in the transport body. The UE 100 may be a sensor or a device provided in the sensor. It is noted that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The NG-RAN 20 includes a plurality of base stations 200. Each of the base stations 200 manages at least one cell. A cell forms a minimum unit of a communication area. One cell belongs to one frequency (a carrier frequency) and is formed by one component carrier. The term "cell" may represent a radio communication resource, and may also represent a communication target of the UE 100. Each base station 200 can perform radio communication with the UE 100 existing in its own cell. The base station 200 communicates with the UE 100 by using a protocol stack of a radio access network (RAN). The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an access and mobility management function (AMF) and/or a user plane function (UPF). The AMF performs mobility management of the UE 100. The UPF provides a function specialized for user plane processing. The AMF and the UPF are connected to the base station 200 via the NG interface.

Figure 2:
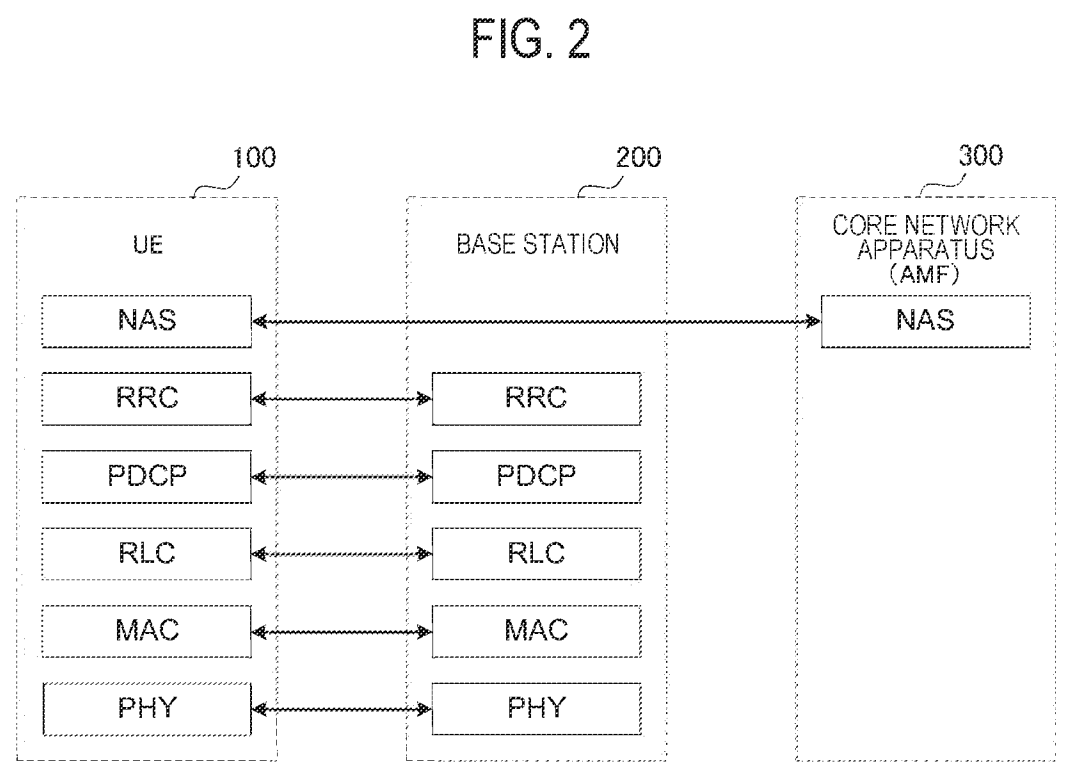

Next, a configuration example of the protocol stack according to the present embodiment will be described with reference to FIG. 2.

A protocol of a radio section between the UE 100 and the base station 200 includes a physical (PHY) layer, a medium access control (MAC) layer, a radio link control (RLC) layer, a packet data convergence protocol (PDCP) layer, and an RRC layer.

The PHY layer performs encoding/decoding, modulation/demodulation, antenna mapping/demapping, and resource mapping/demapping. Data and control information are transmitted, via a physical channel, between the PHY layer of the UE 100 and the PHY layer of the base station 200.

The MAC layer performs priority control of data, a retransmission process by hybrid automatic repeat request (hybrid ARQ (HARQ)), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size, and modulation and coding scheme (MCS)) and allocated resources to the UE 100.

The RLC layer transmits data to the RLC layer on the reception side using the functions of the MAC layer and the PHY layer. Data and control information are transmitted, via a logical channel, between the RLC layer of the UE 100 and the RLC layer of the base station 200.

The PDCP layer performs header compression/decompression and encryption/decryption.

A service data adaptation protocol (SDAP) layer may be provided as a higher layer of the PDCP layer. The service data adaptation protocol (SDAP) layer performs mapping between an IP flow, which is a unit in which a core network performs QoS control, and a radio bearer, which is a unit in which an access stratum (AS) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where the RRC connection between the RRC of the UE 100 and the RRC of the base station 200 is suspended, the UE 100 is in an RRC inactive state.

A NAS layer located above the RRC layer performs session management and mobility management of the UE 100. NAS signaling is transmitted between the NAS layer of the UE 100 and a NAS layer of a mobility management apparatus 221. Note that the UE 100 has an application layer and the like in addition to a protocol of a radio interface.

(Search Spaces and SSSG Switching)

Next, search spaces and SSSG switching according to the present embodiment will be described with reference to FIGS. 3 to 5. In the present embodiment, the search spaces may be referred to as a search space set.

The base station 200 configures, to the UE 100, a search space corresponding to a candidate timing at which a PDCCH is allocated. The UE 100 in the RRC connected state monitors the PDCCH in the configured search space and receives downlink control information (DCI) carried on the PDCCH. The UE 100 receives a physical downlink share channel (PDSCH) and/or transmits a physical uplink share channel (PUSCH) according to the resource allocation (scheduling) indicated by the DCI. For example, the UE 100 may monitor a set of candidates for the PDCCH according to the corresponding search space. That is, the UE 100 may monitor the set of candidates for the PDCCH in a control resource set (CORESET) in a downlink BWP (DL BWP: BandWidth Part) in a serving cell in which the monitoring of the PDCCH is configured according to the corresponding search space. Here, the monitoring may indicate decoding each of the candidates for the PDCCH according to a DCI format to be monitored.

Figure 3:
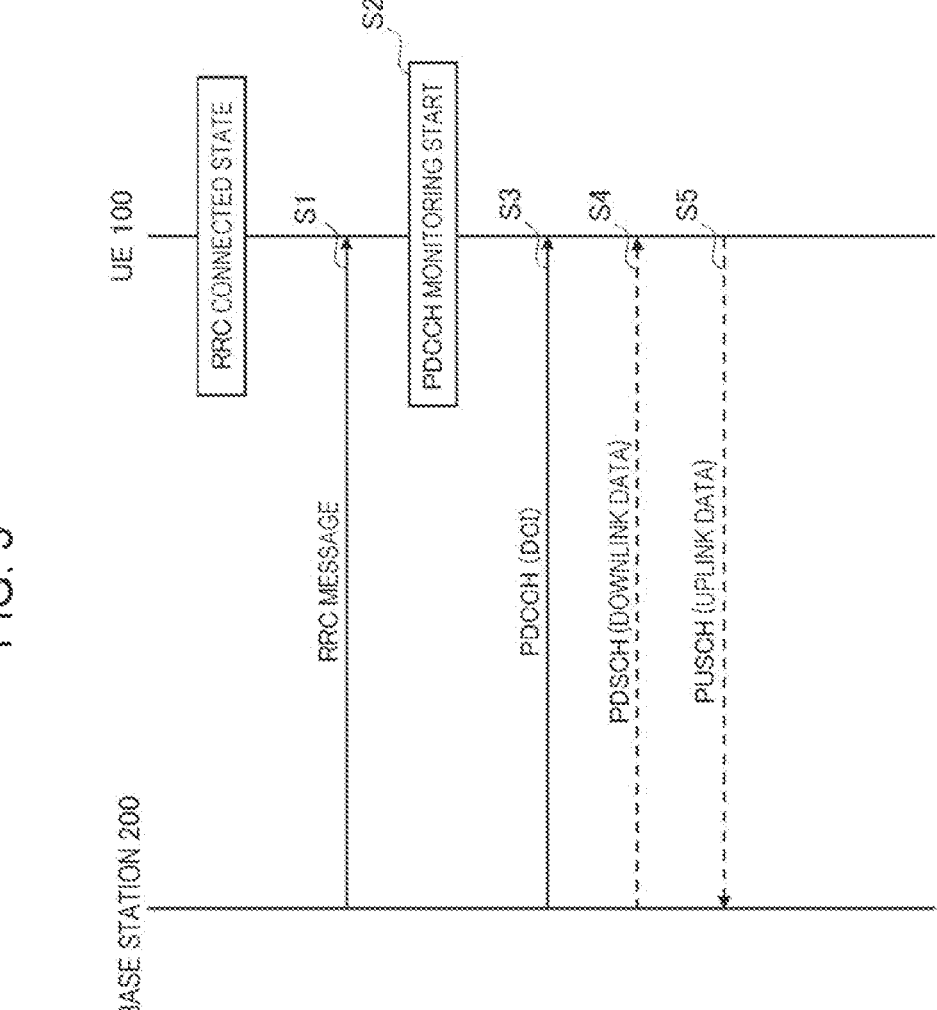
FIG. 3 is a diagram for describing a search space and SSSG switching according to the embodiment.

As illustrated in FIG. 3, in step S1, the base station 200 transmits an RRC message including configuration information (PDCCH configuration information) regarding the PDCCH to the UE 100, and performs various configurations regarding the PDCCH to the UE 100. The RRC message may be a UE-specific RRC message, and may be, for example, an RRC reconfiguration message. Here, the configuration information regarding the PDCCH includes a search space periodicity (also referred to as a PDCCH monitoring periodicity), a search space offset (also referred to as a PDCCH monitoring offset), a search space period (for example, the number of consecutive slots), a symbol for PDCCH monitoring, an aggregation level, a type of the search space, a DCI format, and the like. Here, the type of the search space may include UE-specific search space (USS) and/or UE-common search space (CSS).

The DCI format includes a scheduling DCI format used for scheduling the PDSCH or the PUSCH and a non-scheduling DCI format not used for such scheduling. The DCI transmitted in the scheduling DCI format is referred to as scheduling DCI, and the DCI transmitted in the non-scheduling DCI format is referred to as non-scheduling DCI.

The scheduling DCI format includes downlink DCI formats (for example, DCI format 1_0, DCI format 1_1, and DCI format 1_2) used for scheduling the PDSCH and uplink DCI formats (for example, DCI format 0_0, DCI format 0_1, and DCI format 0_2) used for scheduling the PUSCH. On the other hand, examples of the non-scheduling DCI format include a DCI format 2_0 and DCI format 2_6.

In step S2, the UE 100 starts monitoring the PDCCH in the search space configured from the base station 200. For example, each of the DCI format 1_0, the DCI format 0_0, the DCI format 1_1, the DCI format 0_1, the DCI format 1_2, and the DCI format 0_2 is configured to the UE 100. The UE 100 monitors the PDCCH (DCI) based on the configuration. For example, the base station 200 may perform configuration such that the UE 100 monitors the DCI format 1_0 and the DCI format 0_0 in a certain search space. In addition, the base station 200 may perform configuration such that the UE 100 monitors the DCI format 1_1 and the DCI format 0_1 in a certain search space. In addition, the base station 200 may perform configuration such that the UE 100 monitors the DCI format 1_2 and the DCI format 0_2 in a certain search space. That is, for example, in a case where the CSS is configured for a certain search space, the base station 200 may perform configuration such that the UE 100 monitors candidates for the PDCCH for the DCI format 1_0 and the DCI format 0_0. In addition, in a case where the CSS is configured for a certain search space, the base station 200 may perform configuration such that the UE 100 monitors candidates for the PDCCH for the DCI format 2_0. In addition, in a case where the USS is configured for a certain search space, the base station 200 may perform configuration such that the UE 100 monitors candidates for the PDCCH for the DCI format 1_0 and the DCI format 0_0 or the DCI format 1_1 and the DCI format 0_1. In addition, in a case where the USS is configured for a certain search space, the base station 200 may perform configuration such that the UE 100 monitors candidates for the PDCCH for the DCI format 1_0 and the DCI format 0_0 or the DCI format 1_2 and the DCI format 0_2.

In step S3, the UE 100 receives and detects a DCI addressed to its own UE from the base station 200. For example, the UE 100 performs blind decoding of the PDCCH using a cell-radio network temporary identifier (C-RNTI) and a modulation and coding scheme-C-RNTI (MCS-C-RNTI) or a configured scheduling-RNTI (CS-RNTI) allocated from the base station 200 to the UE 100, and acquires a DCI which has been successfully decoded as a DCI addressed to its own UE. Here, a CRC parity bit scrambled by the C-RNTI and the MCS-C-RNTI or the CS-RNTI is added to the DCI transmitted from the base station 200.

When the DCI indicates scheduling of the PDSCH, in step S4, the UE 100 receives downlink data from the base station 200 with the scheduled PDSCH.

When the DCI indicates scheduling of the PUSCH, in step S5, the UE 100 transmits uplink data to the base station 200 with the scheduled PUSCH.

As described above, the UE 100 monitors the PDCCH in the search space configured from the base station 200. In the present embodiment, the base station 200 switches the configuration of the search space to be applied by the UE 100 in order to reduce power consumption of the UE 100 in the RRC connected state. Here, each of the search spaces (each of the configurations of the search space) may be associated with one CORESET. In addition, the search space may be configured for each of one or more DL BWPs.

Figure 4:
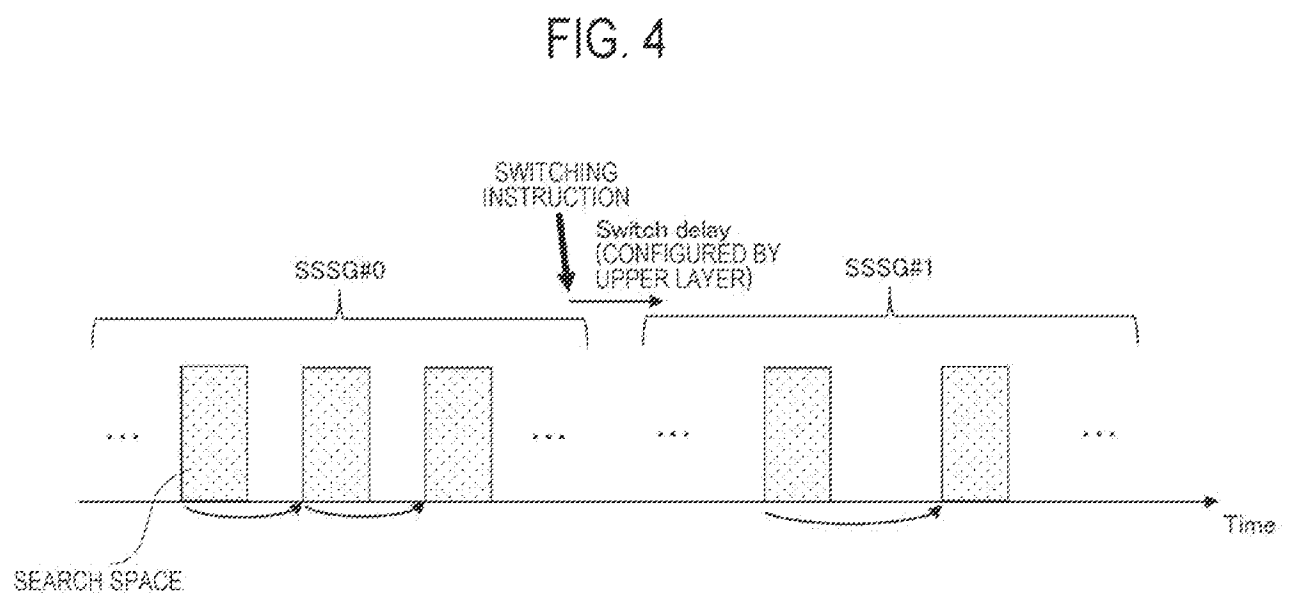

For example, as illustrated in FIG. 4, the base station 200 configures, to the UE 100, SSSG #0 having a normal search space periodicity and SSSG #1 for power saving having a search space periodicity longer than the normal search space periodicity. Here, the SSSG is a set (group) of search spaces, and may be referred to as a search space set (SSS) or a search space group (SSG). For example, the SSSG may be a set (group) of search spaces to which the same configuration applies. Note that, although FIG. 4 illustrates an example in which the base station 200 configures two SSSGs of the SSSG #0 and the SSSG #1 in the UE 100, three or more SSSGs may be configured to the UE 100 for each of one or more BWPs (for example, DL BWPs). In addition, although an example in which an SSSG having a long search space periodicity is configured as the SSSG #1 for power saving is illustrated, an SSSG having no search space may be configured as the SSSG #1 for power saving. In this case, since the UE 100 omits (skips) the monitoring of the PDCCH in a period of the SSSG #1, it is possible to further reduce the power consumption. Here, "#0" in the SSSG #0 and "#1" in the SSSG #1 indicate an index (also referred to as a search space group ID) for the set (group) of search spaces. That is, one or more search space sets may be associated with a set (group) of search spaces identified by an index. For example, the base station 200 may configure a set (group) of search spaces in the UE 100 by configuring an index associated with the one or more search space sets. Here, in the present embodiment, the name SSSG is merely an example, and any name may be used as long as the name is a set (group) of search spaces associated with one or more search space sets. In addition, there may be no search space in the set (group) of search spaces (the search space may not be configured). For example, in a case where there is no search space, the UE 100 may not execute the monitoring of the PDCCH (monitoring of the candidates for the PDCCH). That is, in a case where there is no search space, the UE 100 may skip the monitoring of the PDCCH.

The base station 200 instructs the UE 100 to switch the SSSG. The base station 200 instructs the UE to switch from the SSSG #0 to the SSSG #1 by using the non-scheduling DCI (for example, DCI format 20). However, the scheduling DCI is not limited to the non-scheduling DCI, and the scheduling DCI may be used as an SSSG switching instruction. The UE 100 starts the PDCCH monitoring in the SSSG #1 on a symbol after a switching delay time (Switch delay) from a last symbol of the PDCCH in the SSSG #0. Such a switching delay time is configured to the UE 100 from the base station 200 by higher layer signaling (that is, the RRC message).

Switching from the SSSG #1 to the SSSG #0 may be instructed by the base station 200 through DCI, similarly to switching from SSSG #0 to SSSG #1, or the UE 100 may switch from the SSSG #1 to the SSSG #0 by using a timer. Such a timer (switching timer) is configured to the UE 100 from the base station 200 by the higher layer signaling (that is, the RRC message). In response to the detection of switching instruction DCI to SSSG #1, the UE 100 activates monitoring the PDCCH in SSSG #1, sets a value of the timer to a value set by a higher layer, and activates the timer. The UE 100 decrements the value of the timer, stops monitoring the PDCCH in the SSSG #1 in a case where the timer expires, and starts monitoring the PDCCH in the SSSG #0 after the switching delay time (Switch delay).

Figure 5:
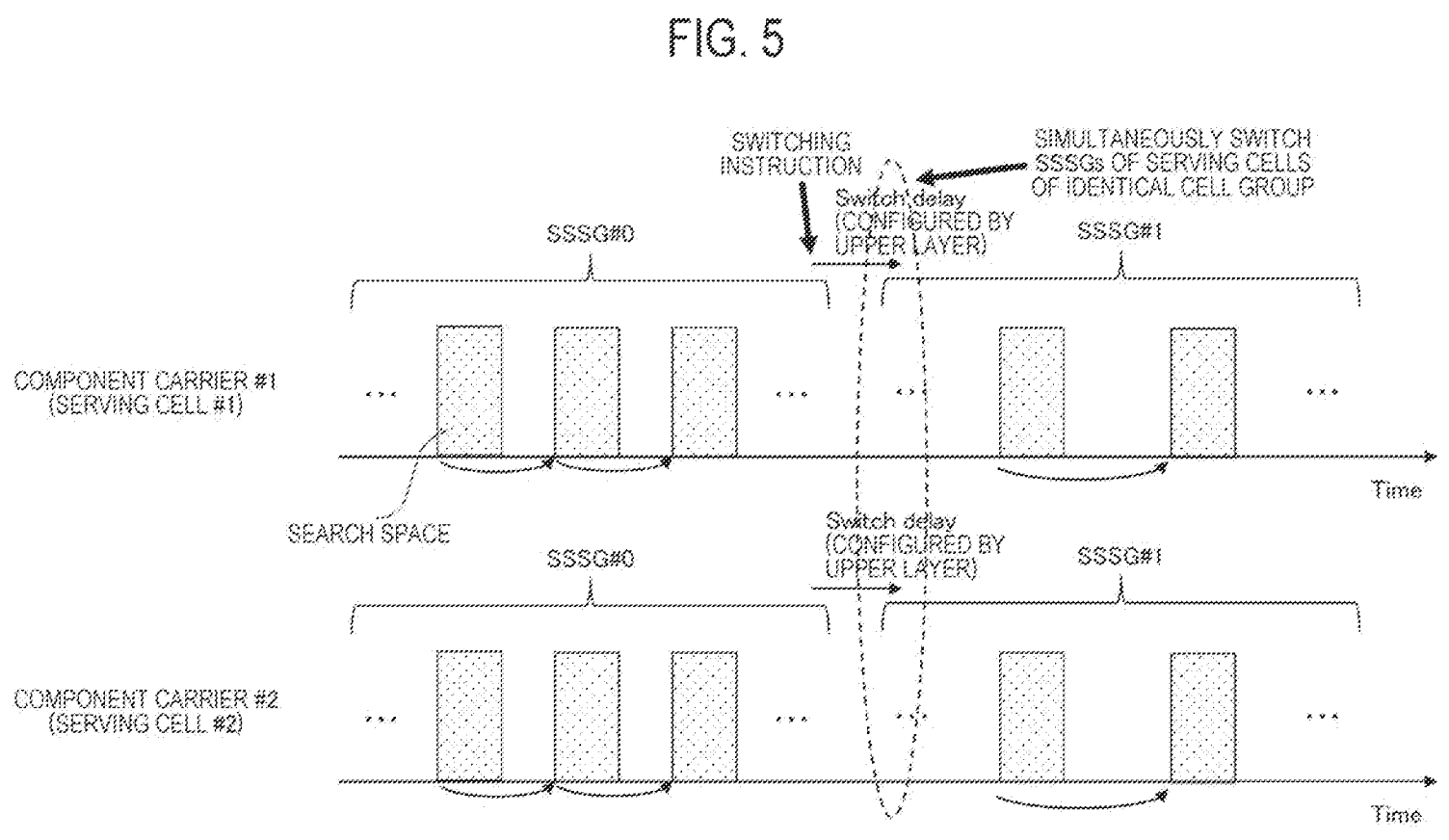

Although the SSSG switching in one cell has been described here, a plurality of serving cells can be configured to the UE 100 by carrier aggregation as illustrated in FIG. 5. FIG. 5 illustrates an example in which a serving cell #1 corresponding to a component carrier #1 and a serving cell #2 corresponding to a component carrier #2 are configured to the UE 100. In such a case, it is efficient to perform the SSSG switching in units of a cell group including a plurality of cells instead of individually performing the SSSG switching for each cell. For example, the base station 200 transmits the SSSG switching DCI to the UE 100 in the serving cell #1, and the UE 100 simultaneously switches SSSGs of the serving cells #1 and #2 from the SSSG #0 to the SSSG #1. Such a cell group is configured to the UE 100 from the base station 200 by the higher layer signaling (that is, the RRC message). For example, in the carrier aggregation, the base station 200 may configure one primary cell and one or more secondary cells. That is, the serving cell includes primary cells and secondary cells. In addition, one or more bandwidth parts (BWPs) may be configured for each of one or more serving cells configured to the UE 100. For example, up to four BWPs may be configured for one serving cell. Here, the BWP may include a downlink BWP (DL BWP) and/or an uplink BWP (UL BWP). That is, up to four DL BWPs and/or up to four UL BWPs may be configured for one serving cell. In addition, one or more control resource sets (CORESET) may be configured for one DL BWP. Here, the CORESET may include a resource in a time domain and/or a frequency domain configured for monitoring the PDCCH. For example, the CORESET may include a predetermined number of symbols (for example, one to three symbols) and a predetermined number of resource blocks (RBs) (for example, 6n (n≥1) RB).

Hereinafter, a case where the carrier aggregation is configured to the UE 100 and the SSSG switching (cell group SSSG switching) is performed in units of the cell group will be mainly described. In such cell group SSSG switching, the number of cell groups configured to the UE 100 is not limited to one, and a plurality of cell groups may be configured to the UE 100. An example of such cell grouping is as follows:

Cell group #1: serving cells #1, #2, #3, and #4

Cell group #2: serving cells #5, #6, #7, and #8

Cell group #3: serving cells #9, #10, #11, #12

Cell group #4: serving cells #13, #14, #15, #16

Here, it is assumed that one serving cell can belong to only one cell group. That is, one serving cell may be configured by the base station 200 to belong to only one cell group.

In a case where such a plurality of cell groups are configured to the UE 100, the UE 100 that has received the SSSG switching instruction from the base station 200 does not know which cell group the SSSGs of the serving cells belonging to are to be simultaneously switched. Thus, in a case where the plurality of cell groups are configured to the UE 100, there is a problem that the UE 100 cannot appropriately perform the cell group SSSG switching. In the present embodiment, the PDCCH monitoring based on the SSSG switching as described above is also referred to as a PDCCH monitoring procedure.

(Configuration of User Equipment)

Figure 6:
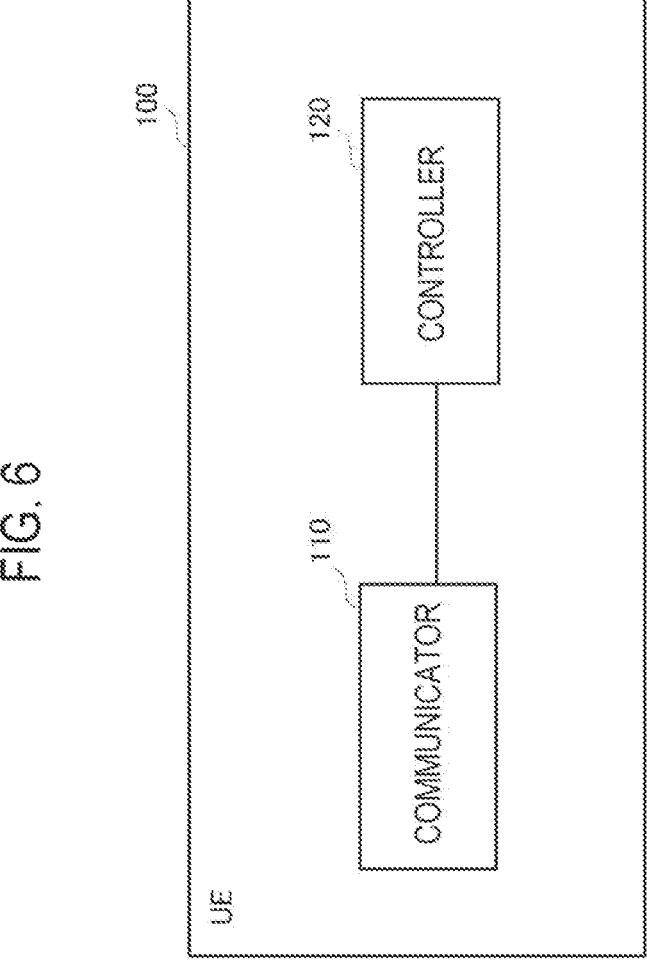
FIG. 6 is a diagram illustrating a configuration of a UE according to the embodiment.

Next, a configuration of the UE 100 according to the present embodiment will be described with reference to FIG. 6. The UE 100 includes a communicator 110 and a controller 120.

The communicator 110 performs radio communication with the base station 200 by transmitting and receiving a radio signal to and from the base station 200. The communicator 110 includes at least one receiver and at least one transmitter. The receiver and the transmitter may include an antenna and an RF circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. An operation of the UE 100 described above and described later may be an operation under the control of the controller 120. The controller 120 may include at least one processor capable of executing a program and a memory that stores the program. The processor may execute the program to perform the operation of the controller 120. The controller 120 may include a digital signal processor that performs digital processing of a signal transmitted and received via the antenna and the RF circuit. The digital processing includes processing of the protocol stack of the RAN. The memory stores the program executed by the processor, a parameter related to the program, and data related to the program. The memory may include at least one of a read only memory (ROM), an erasable programmable read only memory (EPROM), an electrically erasable programmable read only memory (EEPROM), a random access memory (RAM), and a flash memory. All or part of the memory may be included in the processor.

In the UE 100 having the above-described configuration, the plurality of cell groups for cell group SSSG switching are configured to the UE 100. The communicator 110 receives, from the base station 200, the SSSG switching instruction for giving an instruction about the switching of the SSSG in a serving cell belonging to any cell group of the plurality of cell groups. For example, the SSSG switching instruction is SSSG switching DCI for giving the instruction about the switching of the SSSG. The controller 120 specifies, from among the plurality of cell groups, a cell group to which the serving cell for which the SSSG switching instruction is detected belongs, as a target cell group to be an SSSG switching target. The controller 120 simultaneously switches the SSSGs of all the serving cells in the specified target cell group in response to the reception of the SSSG switching instruction. As described above, the controller 120 uses characteristics that one serving cell can belong to only one cell group, and specifies, as an SSSG switching target cell group, the cell group to which the serving cell for which the SSSG switching instruction is detected belongs. Accordingly, even in a case where the plurality of cell groups are configured to the UE 100, the UE 100 can appropriately perform the cell group SSSG switching.

Alternatively, the communicator 110 may receive an SSSG switching instruction including a cell group identifier of the SSSG switching target cell group or a cell identifier of a cell included in the target cell group from the base station 200. Such an SSSG switching instruction may be an SSSG switching medium access control (MAC) control element (CE). The controller 120 specifies the target cell group to be the SSSG switching target from among the plurality of cell groups based on the cell identifier or the cell group identifier included in the SSSG switching instruction. The controller 120 simultaneously switches the SSSGs of all the serving cells in the specified target cell group in response to the reception of the SSSG switching instruction. As described above, since the cell group identifier of the SSSG switching target cell group or the cell identifier of the cell included in the target cell group is included in the SSSG switching instruction, even in a case where the plurality of cell groups are configured to the UE 100, the UE 100 can appropriately perform the cell group SSSG switching.

(Configuration of Base Station)

Figure 7:
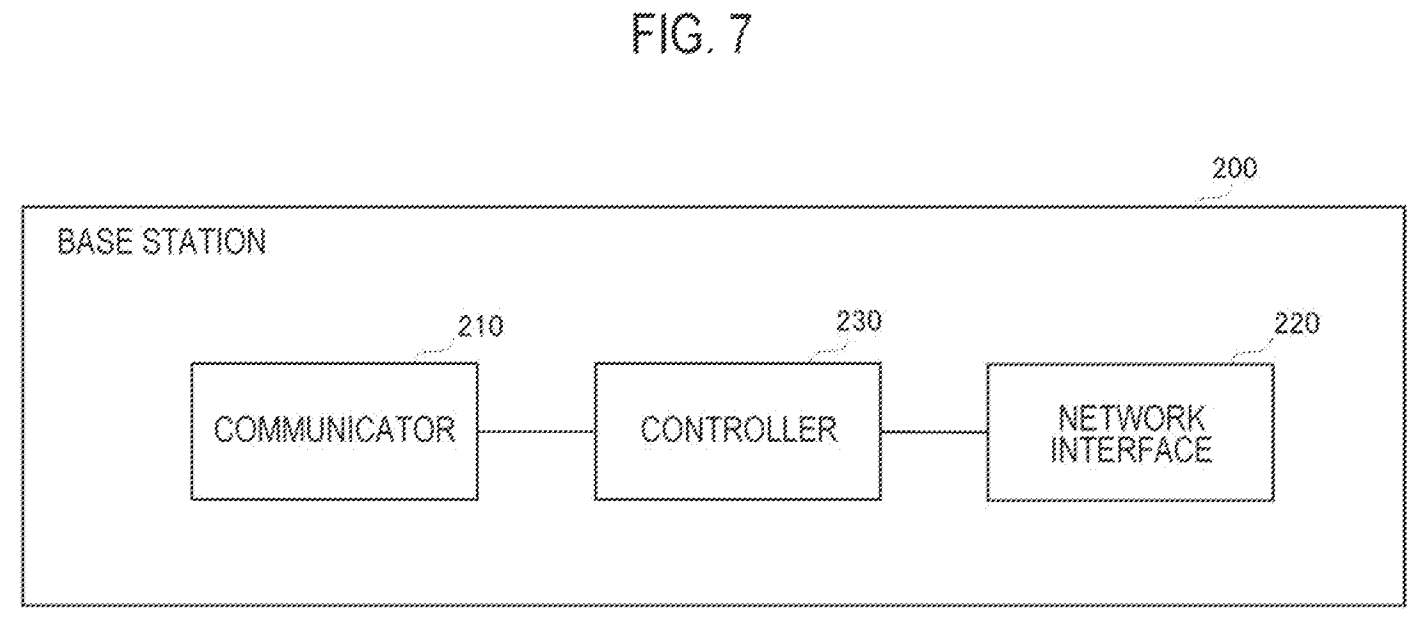

Next, a configuration of the base station 200 according to the present embodiment will be described with reference to FIG. 7. The base station 200 includes a communicator 210, a network interface 220, and a controller 230.

For example, the communicator 210 receives a radio signal from the UE 100 and transmits a radio signal to the UE 100. The communicator 210 may include one or a plurality of receivers that receive radio signals and one or a plurality of transmitters that transmit radio signals.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that stores the program. The processor may execute the program to perform the operation of the controller 230. The controller 230 may include a digital signal processor that performs digital processing of a signal transmitted and received via an antenna and an RF circuit. The digital processing includes processing of the protocol stack of the RAN. The memory stores the program executed by the processor, a parameter related to the program, and data related to the program. All or part of the memory may be included in the processor.

In the base station 200 having the above-described configuration, the communicator 210 transmits, to the UE 100, the SSSG switching instruction for giving the instruction about the switching of the SSSG in a serving cell belonging to any cell group of the plurality of cell groups configured to the UE 100. For example, the SSSG switching instruction is SSSG switching DCI for giving the instruction about the switching of the SSSG. Specifically, the communicator 110 transmits, to the UE 100, the SSSG switching instruction in the serving cell belonging to the SSSG switching target cell group. Accordingly, even though the cell group identifier of the SSSG switching target cell group or the cell identifier of the cell belonging to the target cell group is not included in the SSSG switching instruction, the target cell group can be implicitly indicated by which serving cell transmits the SSSG switching instruction.

Alternatively, the communicator 210 may transmit, to the UE 100, the SSSG switching instruction including the cell group identifier of the SSSG switching target cell group or the cell identifier of the cell included in the target cell group. Such an SSSG switching instruction may be the SSSG switching MAC CE. As described above, the cell group identifier of the SSSG switching target cell group or the cell identifier of the cell included in the target cell group is included in the SSSG switching instruction, and thus, the SSSG switching target cell group can be explicitly indicated. Thus, the communicator 210 may transmit the SSSG switching instruction to the UE 100 in the serving cell that does not belong to the SSSG switching target cell group. For example, the SSSG switching instruction may be constantly transmitted to the UE 100 in a primary cell (PCell) among the plurality of serving cells.

(First Operation Example of Cell Group SSSG Switching)

Figure 8:
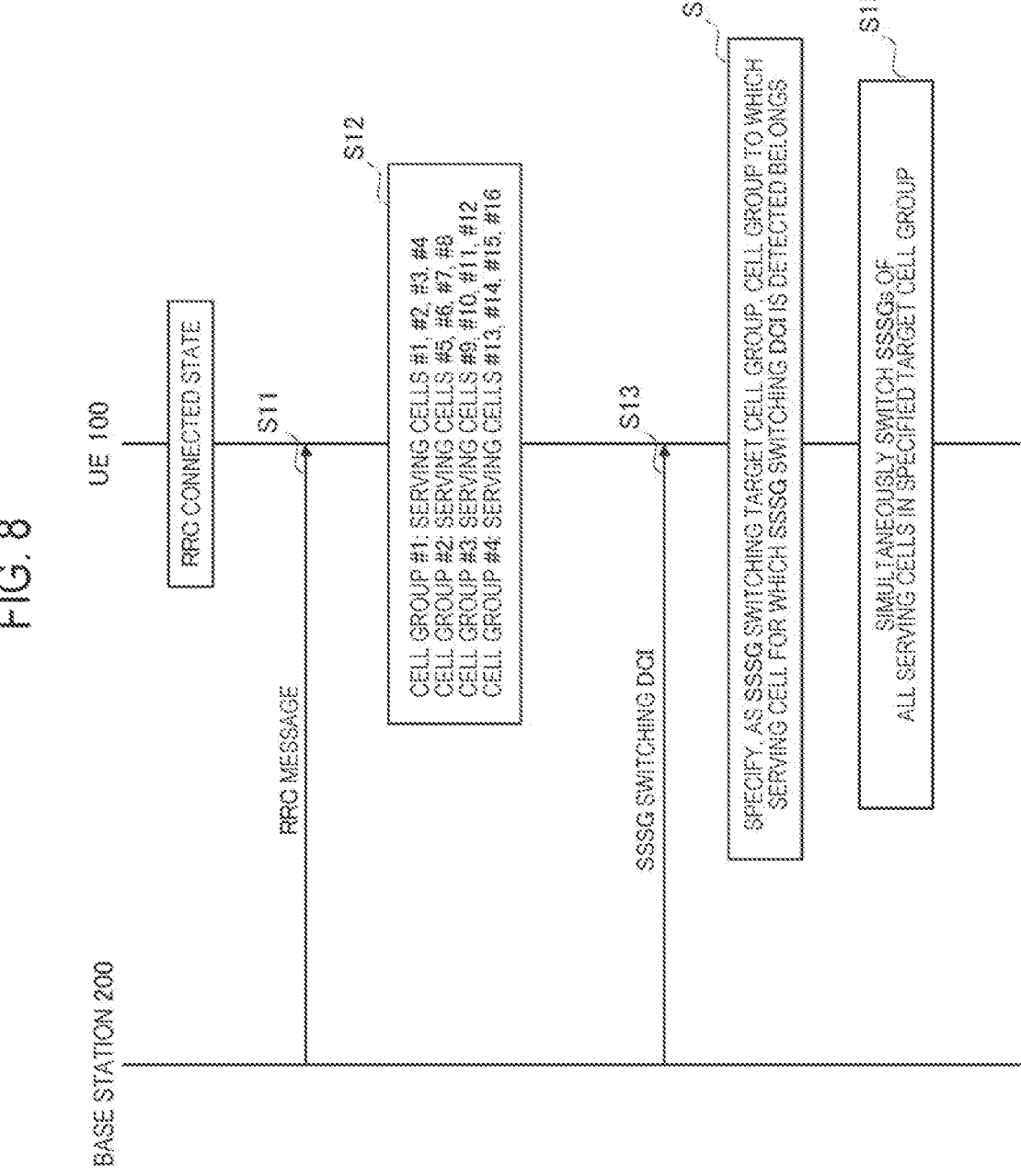
FIG. 8 is a diagram illustrating a first operation example of cell group SSSG switching according to a first embodiment.

Next, a first operation example of the cell group SSSG switching according to the present embodiment will be described with reference to FIG. 8. The first operation example is an operation example in which the base station 200 implicitly indicates the SSSG switching target cell group to the UE 100. Note that it is assumed that the UE 100 is in the RRC connected state.

In step S11, the base station 200 (communicator 210) transmits, to the UE 100, an RRC message including cell group configuration information related to the configuration of the cell group together with the PDCCH configuration information described above. The UE 100 (communicator 110) receives the RRC message. The RRC message may be a UE-specific RRC message, and may be, for example, an RRC reconfiguration message. The cell group configuration information may be a cell list for each cell group. Each cell list may include a cell identifier of each serving cell belonging to a corresponding cell group. In the RRC message, each cell group may be individually associated with PDCCH configuration information (including SSSG configuration information). That is, a plurality of SSSGs may be individually configured for each cell group. Here, a default SSSG may be designated for each cell group. Details of the default SSSG will be described in a fifth embodiment to be described later.

In step S12, the UE 100 (controller 120) stores and applies the configuration information included in the RRC message received in step S11, and controls communication with the base station 200 based on the configuration information. Here, the cell group configured to the UE 100 includes, for example, cell group #1: serving cells #1, #2, #3, and #4
    cell group #2: serving cells #5, #6, #7, and #8
    cell group #3: serving cells #9, #10, #11, #12
    cell group #4: the serving cells #13, #14, #15, and #16.

In step S13, the base station 200 (communicator 210) determines the SSSG switching target cell group, and transmits, to the UE 100, the SSSG switching DCI in the serving cell belonging to the target cell group. The UE 100 (communicator 110) receives the SSSG switching DCL. Specifically, the UE 100 (communicator 110) detects the SSSG switching DCI by blind decoding of the PDCCH.

The SSSG switching DCI may be the scheduling DCI described above. Accordingly, since it is possible to notify the UE 100 of the scheduling of the PDSCH or the PUSCH and instruct the UE 100 to perform the SSSG switching, it is possible to realize efficient SSSG switching.

The SSSG switching DCI may be the non-scheduling DCI described above. Accordingly, even in a case where there is no data to be transmitted and received by the UE 100, it is possible to instruct the UE 100 to switch the SSSG. The non-scheduling DCI may be DCI that can be simultaneously transmitted to a plurality of UEs 100. For example, the non-scheduling DCI may be transmitted by applying a common radio network temporary identifier (RNTI) to the plurality of UEs 100.

In step S14, the UE 100 (controller 120) specifies, as the SSSG switching target cell group, the cell group to which the serving cell for which the SSSG switching DCI is detected belongs. Accordingly, even though the identifier indicating the SSSG switching target cell group is not included in the SSSG switching DCI, the SSSG switching target cell group can be appropriately specified.

For example, in a case where the SSSG switching DCI is received by the serving cell #1, the UE 100 (controller 120) specifies, as the SSSG switching target cell group, the cell group #1 to which the serving cell #1 belongs. Alternatively, in a case where the SSSG switching DCI is received by the serving cell #10, the UE 100 (controller 120) specifies, as the SSSG switching target cell group, the cell group #3 to which the serving cell #10 belongs.

In step S15, the UE 100 (controller 120) simultaneously switches the SSSGs of all the serving cells in the SSSG switching target cell group specified in step S14. For example, the UE 100 (controller 120) collectively switches the SSSGs of all the serving cells in the SSSG switching target cell group from the default SSSG (for example, SSSG #0) to the SSSG for power saving (for example, SSSG #1). That is, the UE 100 may determine the cell group to which the PDCCH monitoring procedure is applied based on the serving cell for which the SSSG switching DCI is detected. That is, in a case where the SSSG switching DCI is detected in a certain serving cell, the UE 100 may apply the PDCCH monitoring procedure to the cell group to which the certain serving cell belongs.

That is, in a case where the cell group configuration information used to configure one or more cell groups is received and the SSSG switching DCI in a certain serving cell associated with (belonging to) a certain cell group is detected, the UE 100 may apply the PDCCH monitoring procedure to a certain cell group associated with (belonging to) a certain serving cell for which the SSSG switching DCI is detected. That is, in a case where the cell group configuration information used to configure one or more cell groups is received and the SSSG switching DCI in a certain serving cell associated with (belonging to) a certain cell group is detected, the ULE 100 may apply the PDCCH monitoring procedure to a certain cell group for which the SSSG switching DCI is detected. Here, the UE 100 may apply the PDCCH monitoring procedure to all the serving cells in the cell group.

(Second Operation Example of Cell Group SSSG Switching)

Figure 9:
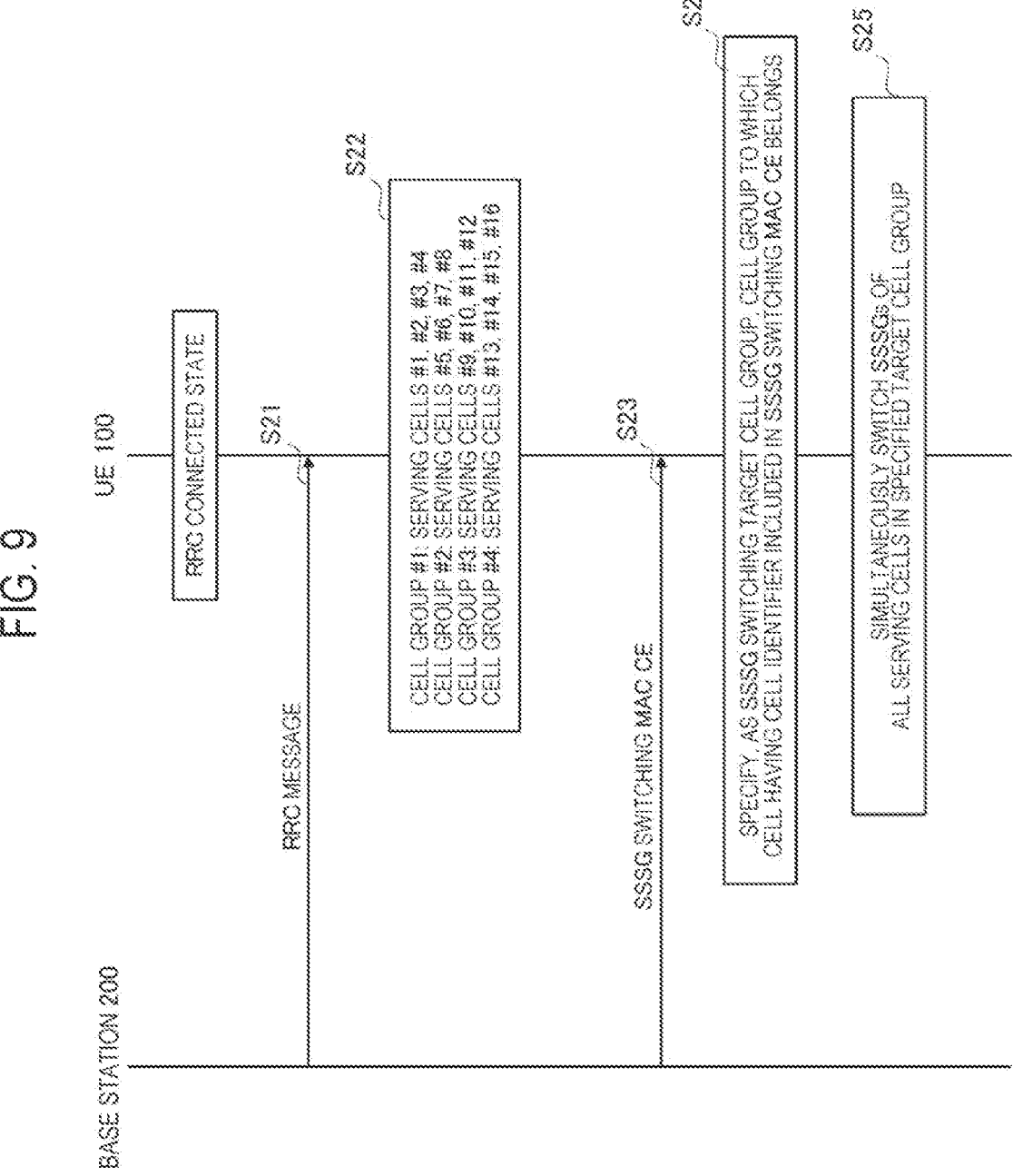
FIG. 9 is a diagram illustrating a second operation example of cell group SSSG switching according to the first embodiment.

Next, a second operation example of the cell group SSSG switching according to the present embodiment will be described focusing on differences from the above-described first operation example with reference to FIG. 9. The second operation example is an operation example in which the base station 200 explicitly indicates the SSSG switching target cell group to the UE 100. Note that it is assumed that the UE 100 is in the RRC connected state.

Operations in steps S21 and S22 are similar to the operations in steps S11 and S12 described above.

In step S23, the base station 200 (communicator 210) determines the SSSG switching target cell group, and transmits, to the UE 100, the SSSG switching MAC CE including the cell group identifier of the SSSG switching target cell group or the cell identifier of the serving cell belonging to the SSSG switching target cell group. The base station 200 (communicator 210) may transmit the SSSG switching MAC CE to the UE 100 in the serving cell that does not belong to the SSSG switching target cell group. The UE 100 (communicator 110) receives the SSSG switching MAC CE.

In step S24, the UE 100 (controller 120) specifies the switching target cell group of the SSSG from among the plurality of cell groups based on the cell identifier or the cell group identifier included in the SSSG switching MAC CE. In a case where the cell identifier is included in the SSSG switching MAC CE, the UE 100 (controller 120) specifies, as the target cell group, the cell group to which the serving cell indicated by the cell identifier included in the SSSG switching MAC CE belongs.

For example, in a case where the cell identifier included in the SSSG switching MAC CE indicates the serving cell #1, the UE 100 (controller 120) specifies, as the SSSG switching target cell group, the cell group #1 to which the serving cell #1 belongs. Alternatively, in a case where the cell identifier included in the SSSG switching MAC CE indicates the serving cell #10, the UE 100 (controller 120) specifies, as the SSSG switching target cell group, the cell group #3 to which the serving cell #10 belongs.

In step S25, the UE 100 (controller 120) simultaneously switches the SSSGs of all the serving cells in the SSSG switching target cell group specified in step S24. For example, the UE 100 (controller 120) collectively switches the SSSGs of all the serving cells in the SSSG switching target cell group from the default SSSG (for example, SSSG #0) to the SSSG for power saving (for example, SSSG #1).

The SSSG switching MAC CE may further include an SSSG identifier indicating an SSSG as a switching destination. In step S25, the UE 100 (controller 120) may simultaneously perform switching to the SSSG of the switching destination indicated by the SSSG identifier for all the serving cells in the SSSG switching target cell group specified in step S24.

The SSSG switching MAC CE may further include a BWP identifier indicating a bandwidth part (BWP) to which the SSSG switching target cell group belongs. The UE 100 (controller 120) may specify the BWP of the SSSG switching target cell group specified in step S24 based on the BWP identifier.

Figure 10:
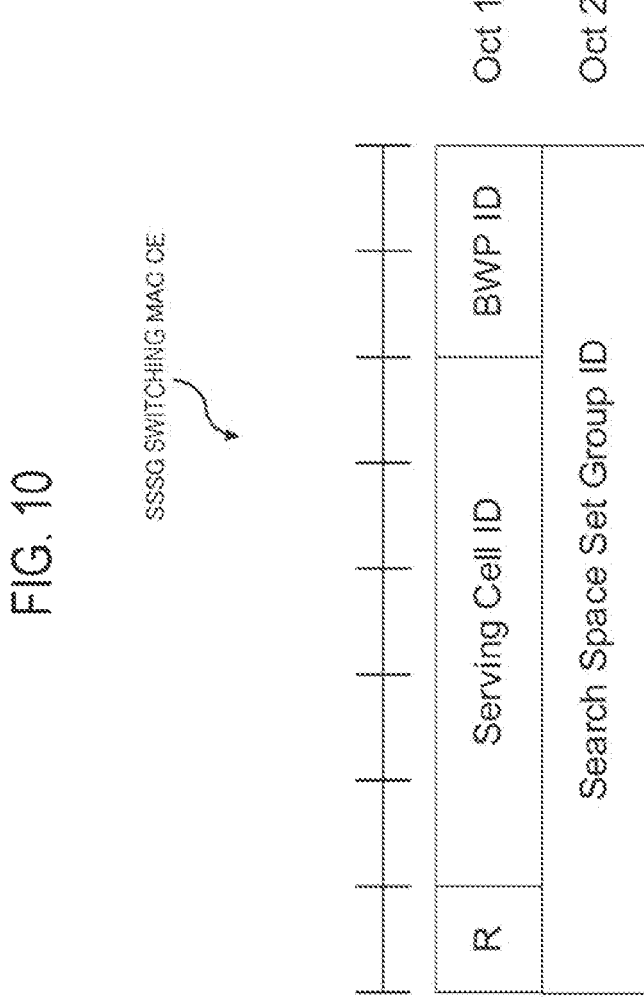
FIG. 10 is a diagram illustrating a configuration example of an SSSG switching MAC CE according to the first embodiment.

Next, a configuration example of the SSSG switching MAC CE according to the present embodiment will be described with reference to FIG. 10. The SSSG switching MAC CE may be referred to as a "Serving Cell Set based Search Space Set Group Indication MAC CE". The SSSG switching MAC CE may be configured to be identifiable by a MAC PDU subheader with an eLCID defined for the SSSG switching MAC CE. The SSSG switching MAC CE includes the following fields and has a fixed size.

Serving cell ID (cell identifier): this field indicates an ID of a serving cell to which the MAC CE is applied, and a length of the field is, for example, 5 bits. In a case where the serving cell indicated by the serving cell ID is configured as a part of the cell group, the MAC CE is applied to all the serving cells in the cell group to which the serving cell belongs.

BWP ID (BWP identifier): this field indicates a downlink BWP to which this MAC CE is applied. A length of the BWP ID field is, for example, two bits.

Search space set group ID (SSSG identifier): this field indicates a search space set group (SSSG) in which the UE monitors the PDCCH, that is, the SSSG as the switching destination. A length of the field is, for example, 8 bits.

R: is a reserved bit and is set to "0".

Note that at least a part of the information included in the SSSG switching MAC CE in the second operation example may be included in the SSSG switching DCI in the first operation example described above.

(Modification)

In the first operation example of the cell group SSSG switching described above, an example in which the base station 200 implicitly indicates the SSSG switching target cell group to the UE 100 by the SSSG switching DCI has been described. However, the base station 200 may implicitly indicate the SSSG switching target cell group to the UE 100 by the SSSG switching MAC CE instead of the SSSG switching DCI. That is, the SSSG switching DCI in the first operation example of the cell group SSSG switching described above may be replaced with the SSSG switching MAC CE. In such a modification, the UE 100 (controller 120) may specify, as the target cell group, the cell group to which the serving cell for which the SSSG switching MAC CE is detected belongs. In addition, in such a modification, the SSSG switching MAC CE may include the SSSG identifier indicating the SSSG as the switching destination. The UE 100 (controller 120) may simultaneously perform switching to the SSSG of the switching destination indicated by the SSSG identifier for all the serving cells in the SSSG switching target cell group. Further, in such a modification, the SSSG switching MAC CE may further include the BWP identifier indicating the bandwidth part (BWP) to which the target cell group belongs.

In the second operation example of the cell group SSSG switching described above, an example in which the base station 200 explicitly indicates the SSSG switching target cell group to the UE 100 by the SSSG switching MAC CE has been described. However, the base station 200 may explicitly indicate the SSSG switching target cell group to the UE 100 by the SSSG switching DCI instead of the SSSG switching MAC CE. That is, the cell group identifier of the SSSG switching target cell group or the cell identifier of the serving cell belonging to the SSSG switching target cell group may be included in the SSSG switching DCI. In such a modification, the SSSG switching DCI may be the scheduling DCI. Alternatively, the SSSG switching DCI may be the non-scheduling DCI.

Second Embodiment

Next, a second embodiment will be described with reference to FIG. 11. In the second embodiment, it is assumed that the SSSG switching DCI is used as the SSSG switching instruction, and in particular, it is mainly assumed that the scheduling DCI is used as the switching instruction DCI.

In a case where the scheduling DCI is used as the switching instruction DCI, HARQ processing that is data retransmission processing by HARQ may be required. Thus, when the UE 100 immediately starts switching to a power saving state, there is a concern that the HARQ processing cannot be appropriately performed. Therefore, the UE 100 (controller 120) suspends the start of the switching instructed by the switching instruction DCI while a retransmission related timer associated with the HARQ processing for the data scheduled by the switching instruction DCI (scheduling DCI) is operating.

Figure 11:
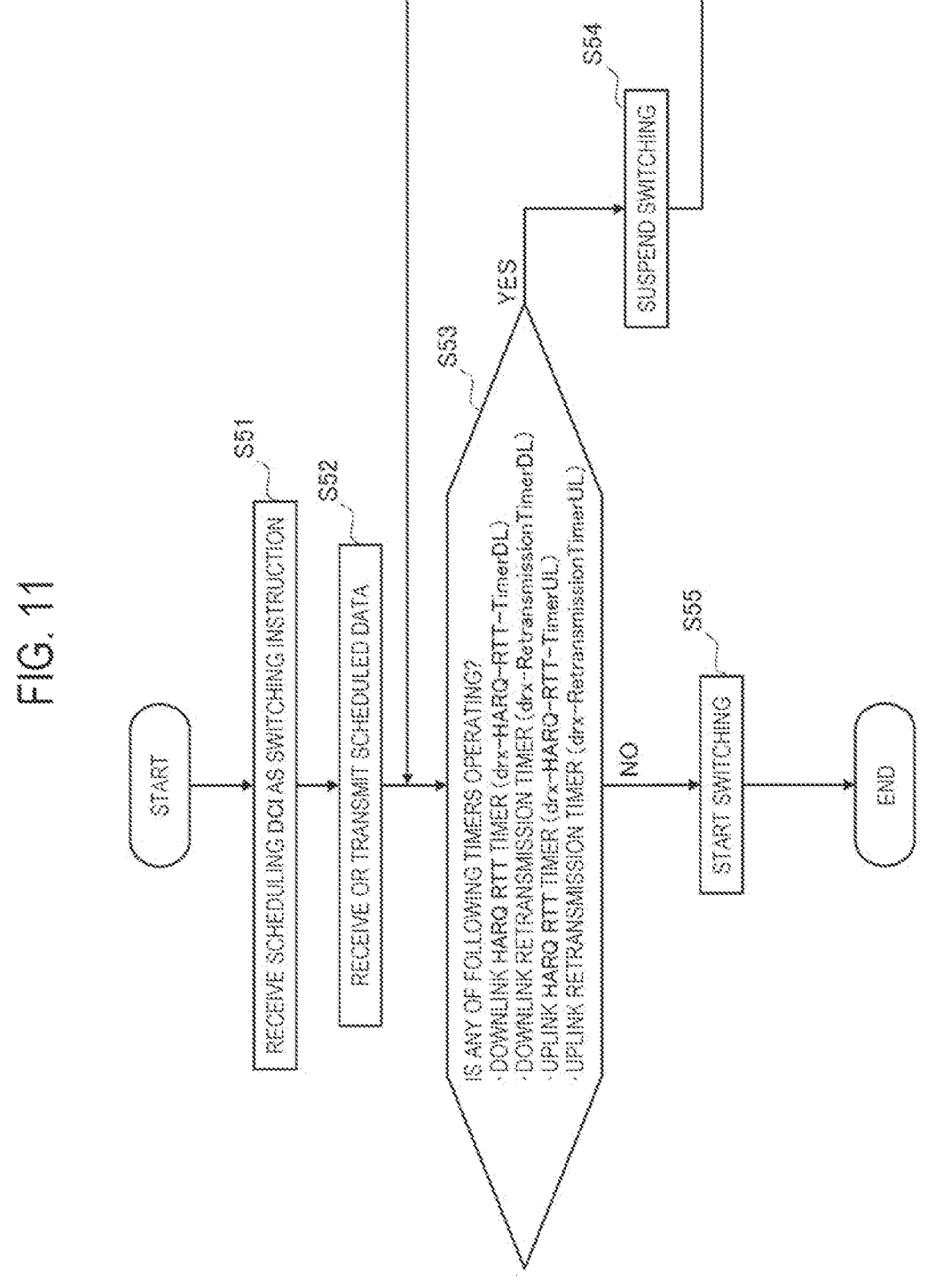
FIG. 11 is a diagram illustrating an operation according to a second embodiment.

As illustrated in FIG. 11, in step S51, the UE 100 (communicator 110) receives the scheduling DCI as the switching instruction DCI on the PDCCH from the base station 200. Such scheduling DCI may include an information field indicating the SSSG of the switching destination in addition to an information field indicating a PDSCH resource or a PUSCH resource allocated to the UE 100.

In step S52, the UE 100 (communicator 110) receives or transmits data scheduled by the scheduling DCI. For example, the UE 100 (communicator 110) receives downlink data by using the allocated PDSCH resource and transmits uplink data by using the allocated PUSCH resource. In a case where the UE 100 (communicator 110) receives the downlink data, the UE 100 (controller 120) attempts data decoding of the received downlink data, and feeds back HARQ feedback indicating whether or not the data decoding is successful, that is, ACK or NACK to the base station 200. In a case where the UE 100 (communicator 110) transmits the uplink data, the UE 100 (controller 120) receives HARQ feedback indicating whether or not the base station 200 succeeds in data decoding of the uplink data, that is, ACK or NACK from the base station 200. The UE 100 (controller 120) manages the HARQ processing with the timer for each data to be received or transmitted, and continues the HARQ processing until the data decoding of the data is completed.

In step S53, the UE 100 (controller 120) determines whether or not any one of next retransmission related timers used for the HARQ processing is operating.
Downlink HARQ RTT Timer (drx-HARQ-RTT (Round Trip Time)-TimerDL)

The downlink HARQ RTT Timer is a timer used for the HARQ processing of the downlink data, and a timer defining a minimum period until downlink allocation for HARQ retransmission expected by a MAC entity of the UE 100 is performed. The UE 100 (the controller 120) starts the downlink HARQ RTT timer in response to the transmission of the HARQ feedback for the downlink data. The UE 100 (the controller 120) does not need to monitor the PDCCH during the operation of the downlink HARQ RTT timer.
Downlink Retransmission Timer (Drx-RetransmissionTimerDL)

The downlink retransmission timer is a timer used for the HARQ processing of the downlink data, and a timer defining a maximum period until downlink retransmission is received. When downlink data decoding is not successful at the expiration of the downlink HARQ RTT timer, the UE 100 (the controller 120) starts the downlink retransmission timer. The UE 100 (the controller 120) monitors the PDCCH and waits for retransmission data during the operation of the downlink retransmission timer.
Uplink HARQ RTT Timer (drx-HARQ-RTT-TimerUL)

The uplink HARQ RTT Timer is a timer used for the HARQ processing of the uplink data, and a timer defining a minimum period until a MAC entity of the UE 100 receives a HARQ retransmission permission (HARQ retransmission grant). The UE 100 (the controller 120) starts the downlink retransmission timer in response to the transmission of the uplink data. The UE 100 (the controller 120) does not need to monitor the PDCCH during the operation of the uplink HARQ RTT timer.
Uplink Retransmission Timer (drx-RetransmissionTimerUL)

The uplink retransmission timer is a timer used for the HARQ processing of the uplink data, and a timer defining a maximum period until uplink retransmission permission is received. The UE 100 (the controller 120) starts the uplink retransmission timer when the uplink HARQ RTT timer expires. The UE 100 (the controller 120) monitors the PDCCH during the operation of the uplink retransmission timer.

In a case where any one of these retransmission related timers is operating (step S53: YES), in step S54, the UE 100 (controller 120) suspends the start of the switching instructed by the switching instruction DCI received in step S51.

On the other hand, in a case where none of the retransmission related timers is operating (step S53: NO), in step S55, the UE 100 (controller 120) starts or executes the switching instructed by the switching instruction DCI received in step S51. For example, the UE 100 (controller 120) may perform the SSSG switching from a first slot after the retransmission related timer expires.

As described above, in the second embodiment, a period during which the retransmission related timer is operating constitutes at least a part of the switching delay time (Switch delay) of the switching instructed by the switching instruction DCI. Note that, in a case where the switching delay time is configured by the higher layer signaling (RRC message), the UE 100 (controller 120) may suspend the start of the switching instructed by the switching instruction DCI in the period during which the retransmission related timer is operating even though the switching delay time configured by the higher layer signaling elapses.

In addition, the switching delay time may include a period during which the retransmission related timer is in operation as follows.

A period during which drx-HARQ-RTT-TimerDL is in operation, in which the drx-HARQ-RTT-TimerDL is started for the corresponding HARQ processing in the first symbol after the transmission of the DL HARQ feedback is finished:

A period during which drx-RetransmissionTimerDL is in operation, in which the drx-RetransmissionTimerDL is started when the corresponding HARQ processing of the first symbol after the expiration of the drx-HARQ-RTT-TimerDL is not successfully decoded:

A period during which drx-HARQ-RTT-TimerUL is in operation, in which the drx-HARQ-RTT-TimerUL is started for the corresponding HARQ processing in the first symbol after the first transmission (in bundle) of the corresponding PUSCH transmission is finished:

A period during which drx-RetransmissionTimerUL is in operation, in which the drx-RetransmissionTimerUL is started for the corresponding HARQ processing in the first symbol after the expiration of the drx-HARQ-RTT-TimerUL.

Furthermore, in a case where the UE 100 (the controller 120) executes a plurality of types of HARQ processing, when at least one retransmission related timer of the plurality of types of HARQ processing is in operation, the start of the switching instructed by the switching instruction DCI may be suspended. For example, the UE 100 may perform SSSG switching (for example, from the first slot after expiration) based on the conditions that the drx-RetransmissionTimerDLs corresponding to all types of HARQ processing have expired and/or the drx-RetransmissionTimerULs corresponding to all types of HARQ processing have expired.

It is noted that the UE 100 (the controller 120) may perform the above-described operation upon receiving a configured DL assignment (that is, a downlink DCI format having CRC scrambled with CS-RNTI) and/or a configured UL grant (that is, an uplink DCI format having CRC scrambled with CS-RNTI).

In addition, in the present embodiment, although various existing timers for DRX are used, the present invention is not limited thereto. A timer used for the HARQ processing and retransmission processing of PDCCH skipping and/or SSSG switching configured in a higher layer may be used. Such a timer is, for example, DCIbasedPowerSaving-HARQ-RTT-TimerDL, DCIbasedPowerSaving-HARQ-RTT-TimerUL, DCIbasedPowerSaving-Retransmission-TimerDL, DCIbasedPowerSaving-RetransmissionTimerUL, or the like. Here, the DCIbasedPowerSaving-HARQ-RTT-TimerDL is an example of a downlink HARQ RTT timer. The DCIbasedPowerSaving-HARQ-RTT-TimerUL is an example of an uplink HARQ RTT timer. The DCIbasedPowerSaving-RetransmissionTimerDL is an example of a downlink retransmission timer. The DCIbasedPowerSaving-RetransmissionTimerUL is an example of an uplink retransmission timer.

Figure 12:
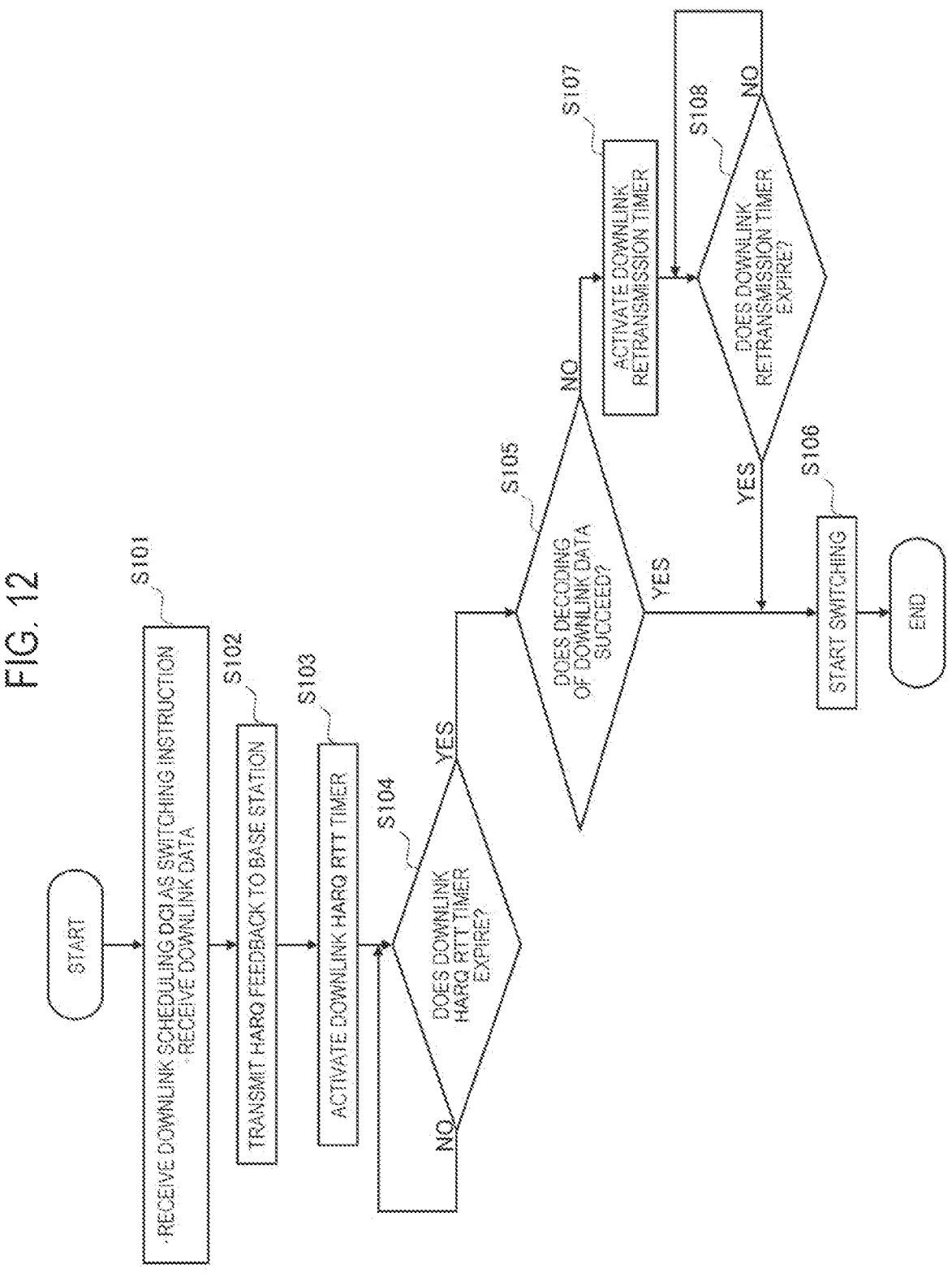
FIG. 12 is a diagram illustrating an operation according to the second embodiment focusing on a downlink.

Next, an operation according to the second embodiment will be described focusing on the downlink with reference to FIG. 12.

In step S101, the UE 100 (the communicator 110) receives a downlink scheduling DCI on a PDCCH as a switching instruction DCI. The downlink scheduling DCI is a DCI for allocating a radio resource (that is, a PDSCH resource) for downlink data. The UE 100 (the communicator 110) receives the downlink data from the base station 200 using the PDSCH resource allocated by the downlink scheduling DCI. The UE 100 (the controller 120) attempts to decode the received downlink data.

In step S102, the UE 100 (the communicator 110) transmits, to the base station 200, an HARQ feedback indicating whether the downlink data received in step S102 is successfully decoded.

In step S103, the UE 100 (the controller 120) starts a downlink HARQ RTT timer in response to the transmission of the HARQ feedback corresponding to the downlink data. The UE 100 (the controller 120) suspends the start of switching instructed by the switching instruction DCI when the downlink HARQ RTT timer is in operation.

When the downlink HARQ RTT timer expires (step S104: YES), in step S105, the UE 100 (the controller 120) determines whether the downlink data is successfully decoded. When the downlink data is successfully decoded (step S105: YES), in step S106, the UE 100 (the controller 120) starts the switching instructed by the switching instruction DCI.

On the other hand, when the downlink data is not successfully decoded (step S105: NO), in step S107, the UE 100 (the controller 120) starts a downlink retransmission timer in response to the expiration of the downlink HARQ RTT timer. The UE 100 (the controller 120) monitors the PDCCH and suspends the start of the switching instructed by the switching instruction DCI while the downlink retransmission timer is in operation.

When the downlink retransmission timer expires (step S108: YES), the UE 100 (the controller 120) starts the switching instructed by the switching instruction DCI in step S106. When retransmission data is received from the base station 200 during the operation of the downlink retransmission timer, the UE 100 (the controller 120) may stop the downlink retransmission timer and return to the processing in step S102.

Figure 13:
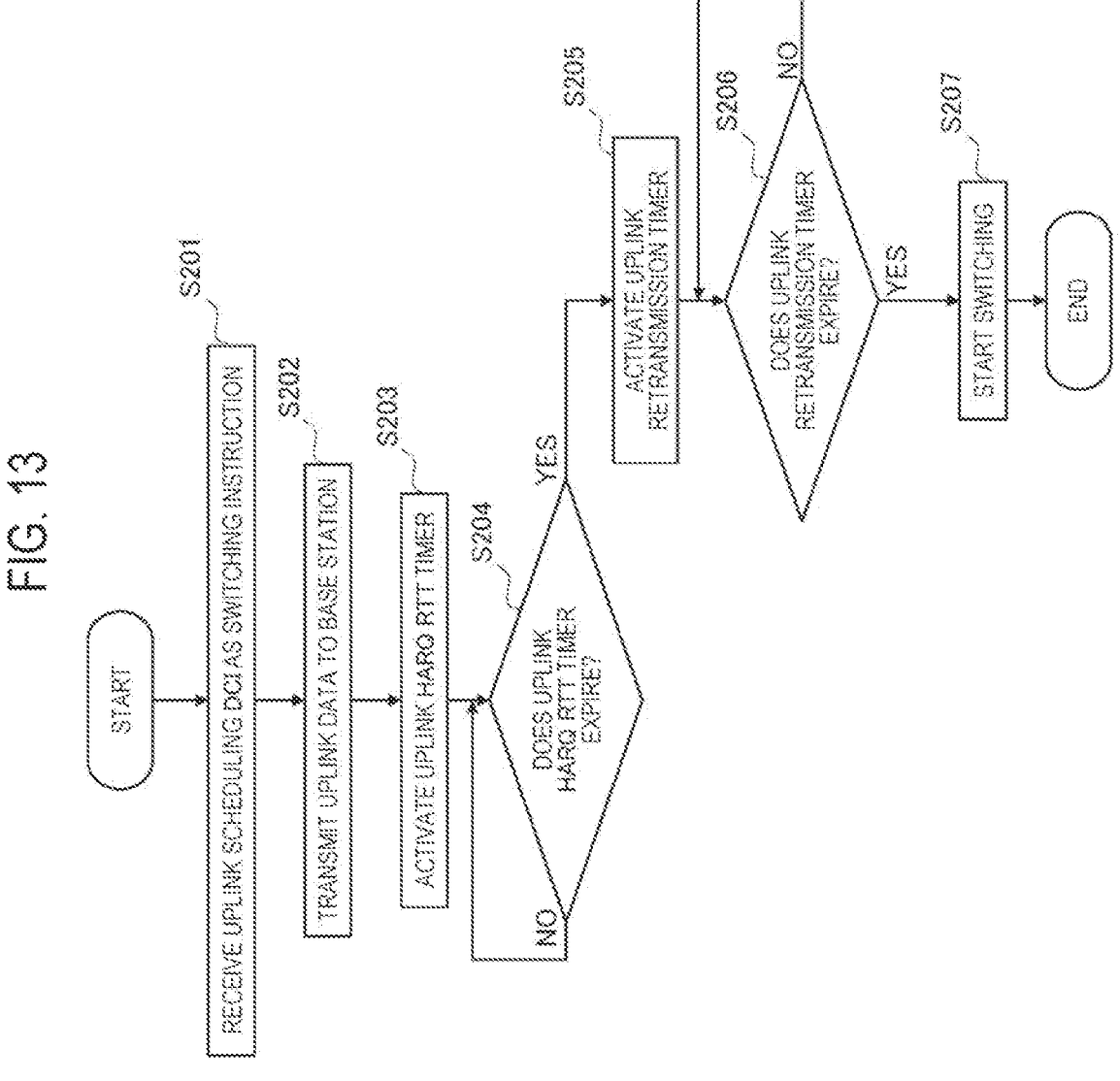
FIG. 13 is a diagram illustrating an operation according to the second embodiment focusing on an uplink.

Next, an operation according to the second embodiment will be described focusing on the uplink with reference to FIG. 13.

In step S201, the UE 100 (the communicator 110) receives an uplink scheduling DCI on a PDCCH as a switching instruction DCI. The uplink scheduling DCI is a DCI for allocating a radio resource (that is, a PUSCH resource) for uplink data.

In step S202, the UE 100 (the communicator 110) transmits the uplink data to the base station 200 using the PUSCH resource allocated by the uplink scheduling DCI.

In step S203, the UE 100 (the controller 120) starts an uplink HARQ RTT timer in response to the transmission of the uplink data. The UE 100 (the controller 120) suspends the start of switching instructed by the switching instruction DCI while the uplink HARQ RTT timer is in operation.

When the uplink HARQ RTT timer expires (step S204: YES), the UE 100 (the controller 120) starts an uplink retransmission timer in step S205. The UE 100 (the controller 120) monitors the PDCCH and suspends the start of the switching instructed by the switching instruction DCI while the uplink retransmission timer is in operation.

When the uplink retransmission timer expires (step S206: YES), in step S207, the UE 100 (the controller 120) starts the switching instructed by the switching instruction DCI.

As described above, according to the second embodiment, the UE 100 that has received the scheduling DCI as the switching instruction suspends the start of the switching while the retransmission related timer associated with the HARQ processing for the data scheduled by the scheduling DCI is operating. Accordingly, even in a case where the scheduling DCI is used as the switching instruction, the HARQ processing can be appropriately performed.

Note that, in the second embodiment, CSI report to the base station 200 may be considered. For example, in a case where the UE 100 that has received the switching instruction DCI is instructed to perform aperiodic CSI report to the base station 200 by the scheduling DCI, the UE 100 (controller 120) may transmit the CSI report to the base station 200 on the scheduled PUSCH and may suspend the start of the switching instructed by the switching instruction DCI until the CSI report is performed. The UE 100 (controller 120) may start the switching instructed by the switching instruction DCI in response to the transmission of the CSI report on the scheduled PUSCH. Note that, details of the CSI report will be described in a third embodiment to be described later.

Third Embodiment

Next, a third embodiment will be described with reference to FIG. 14.

Since a period during which the UE 100 is in the power saving state is considered to be a period during which data transmission and reception are not temporarily performed, it is desirable to reduce power consumption necessary for SRS transmission, CSI measurement, and CSI report.

Here, the SRS transmission refers to an operation in which the base station 200 transmits an SRS, which is an uplink physical signal for channel estimation used for estimating an uplink channel state, to the base station 200, and the UE 100 performs the SRS transmission according to the configuration from the base station 200. SRS report is an operation for link adaptation of an uplink. The link adaptation adapts, to a channel state, a modulation and coding scheme (MCS) applied to data transmission. In a period during which the UE 100 is in the power saving state, since it is less necessary to perform the link adaptation of the uplink, the SRS transmission is suppressed.

The CSI measurement refers to an operation of measuring a reference signal used for estimating a downlink channel state, and the UE 100 performs the CSI measurement according to the configuration from the base station 200. For example, the UE 100 performs the CSI measurement based on at least one of a channel state information reference signal (CSI-RS) and a synchronization signal/physical broadcast channel (SS/PBCH) block transmitted by the base station 200. CSI report refers to an operation of transmitting, to the base station 200, the CSI report indicating a channel state estimated according to the result of the CSI measurement, and the UE 100 performs the CSI report according to the configuration from the base station 200. For example, the channel state includes one or a plurality of a channel quality indicator (CQI), a rank indicator (RI), a precoding matrix indicator (PMI), an SS/PBCH block resource indicator (SSBRI), a CSI-RS resource indicator (CRI), a layer indicator (LI), and a layer 1 reference signal received power (L1-RSRP). The CSI report may be performed on the PUCCH or the PUSCH. The CSI measurement and the CSI report are operations for link adaptation of a downlink. In a period during which the UE 100 is in the power saving state, since it is less necessary to perform the link adaptation of the downlink, the CSI measurement and the CSI report are suppressed.

Figure 14:
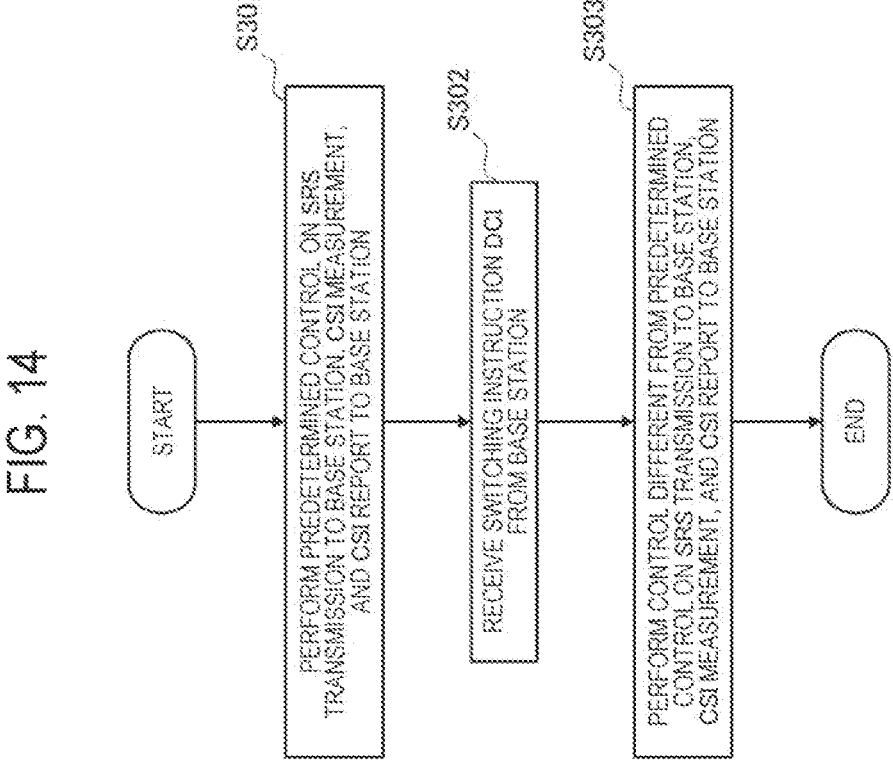
FIG. 14 is a diagram illustrating an operation according to a third embodiment.

As illustrated in FIG. 14, in step S301, in a first state where the PDCCH is monitored in the search space, the UE 100 (controller 120) performs predetermined control to control at least one operation of the SRS transmission to the base station 200, the CSI measurement, and the CSI report to the base station 200. In the first state, the UE 100 (controller 120), may periodically perform at least one operation of the SRS transmission, the CSI measurement, and the CSI report. For example, the UE 100 (controller 120) performs at least one operation of periodic SRS transmission and periodic CSI report in the first state. The periodic SRS transmission may include semi-persistent SRS transmission. The periodic CSI report may include semi-persistent CSI report performed on the PUCCH or PUSCH.

In step S302, the UE 100 (communicator 110) receives the switching instruction DCI for giving an instruction about switching to a second state (for example, power saving state) in which the configuration related to the search space is different from the first state on the PDCCH. In the third embodiment, the switching instruction DCI is not limited to the scheduling DCI as described above, and may be the non-scheduling DCI. The switching instruction DCI may include an information field indicating the SSSG as the switching destination.

In step S303, the UE 100 (controller 120) performs control different from the predetermined control on at least one operation of the SRS transmission, the CSI measurement, and the CSI report in response to the reception of the switching instruction DCI.

For example, the UE 100 (controller 120) stops at least one operation of the SRS transmission, the CSI measurement, and the CSI report within the switching delay time (Switch delay) from the first state to the second state. The UE 100 (controller 120) may stop the periodic SRS transmission and the periodic CSI report within the switching delay time. Such control is expressed as "within the switching delay time including a P$_{switch}$ symbol, the UE is not expected to perform Periodic SRS transmission and semi-persistent SRS transmission Semi-persistent CSI configured for PUSCH Periodic CSI report which is L1-RSRP performed on PUCCH in a case where ps-TransmitPeriodicL1-RSRP does not include a value true Periodic CSI report that is not L1-RSRP performed on the PUCCH in a case where ps-TransmitOtherPeriodicCSI does not include a value true".

The first state may be a state where the PDCCH provided at a predetermined periodicity is monitored in the search space, and the second state may be a state where the monitoring of the PDCCH is skipped (PDCCH skipping state). The UE 100 (controller 120) may not perform at least one operation of the SRS transmission, the CSI measurement, and the CSI report in the second state.

The first state may be a state where the PDCCH provided at a predetermined periodicity is monitored in the search space, and the second state may be a state where the PDCCH is monitored in the search space provided at a periodicity longer than the predetermined periodicity. Switching from the first state to the second state may be realized by the SSSG switching. In the second state, the UE 100 (controller 120) may perform at least one operation of the SRS transmission, the CSI measurement, and the CSI report only in a time section of the search space.

For example, the UE 100 (controller 120) may perform aperiodic SRS transmission only in a monitoring slot which is the time section of the search space in the second state. Such control may be expressed as "the UE for which the SSSG switching is configured by the higher layer signaling does not expect that an SRS resource is available in a slot other than the corresponding monitoring slot in order to trigger the aperiodic SRS transmission in a case where the periodicity of the search space is longer than a predetermined value (for example, 80 milliseconds)".

In addition, the UE 100 (controller 120) may perform the CSI measurement only in the monitoring slot which is the time section of the search space in the second state. Such control may be expressed as "the UE for which the SSSG switching is configured by the higher layer signaling excludes a slot other than the monitoring slot corresponding to the search space in a latest CSI measurement occasion for the CSI report". In addition, such control may be expressed as "the UE for which the SSSG switching is configured by the higher layer signaling does not expect that a CSI-RS resource is available in a slot other than the corresponding monitoring slot in a case where the periodicity of the search space is longer than a predetermined value (for example, 80 milliseconds)".

As described above, according to the third embodiment, the UE 100 that has received the switching instruction DCI performs control different from the control performed before the reception of the switching instruction DCI for at least one operation of the SRS transmission, the CSI measurement, and the CSI report in response to the reception of the switching instruction DCI. Accordingly, in the SRS transmission, the CSI measurement, and the CSI report, since control optimized for the power saving state, for example, control optimized for an extended search space periodicity can be applied, it is possible to further reduce power consumption while reducing the power consumption necessary for monitoring the PDCCH.

Fourth Embodiment

Next, a fourth embodiment will be described with reference to FIG. 15.

In the fourth embodiment, an operation of performing power saving by the SSSG switching is assumed. Specifically, one or a plurality of SSSGs can be configured to the UE 100 from among various SSSGs including a plurality of SSSGs having different search space periodicitys and SSSGs having no search space, and flexible power saving is realized by giving the instruction about the switching of the SSSG by DCI.

Figure 15:
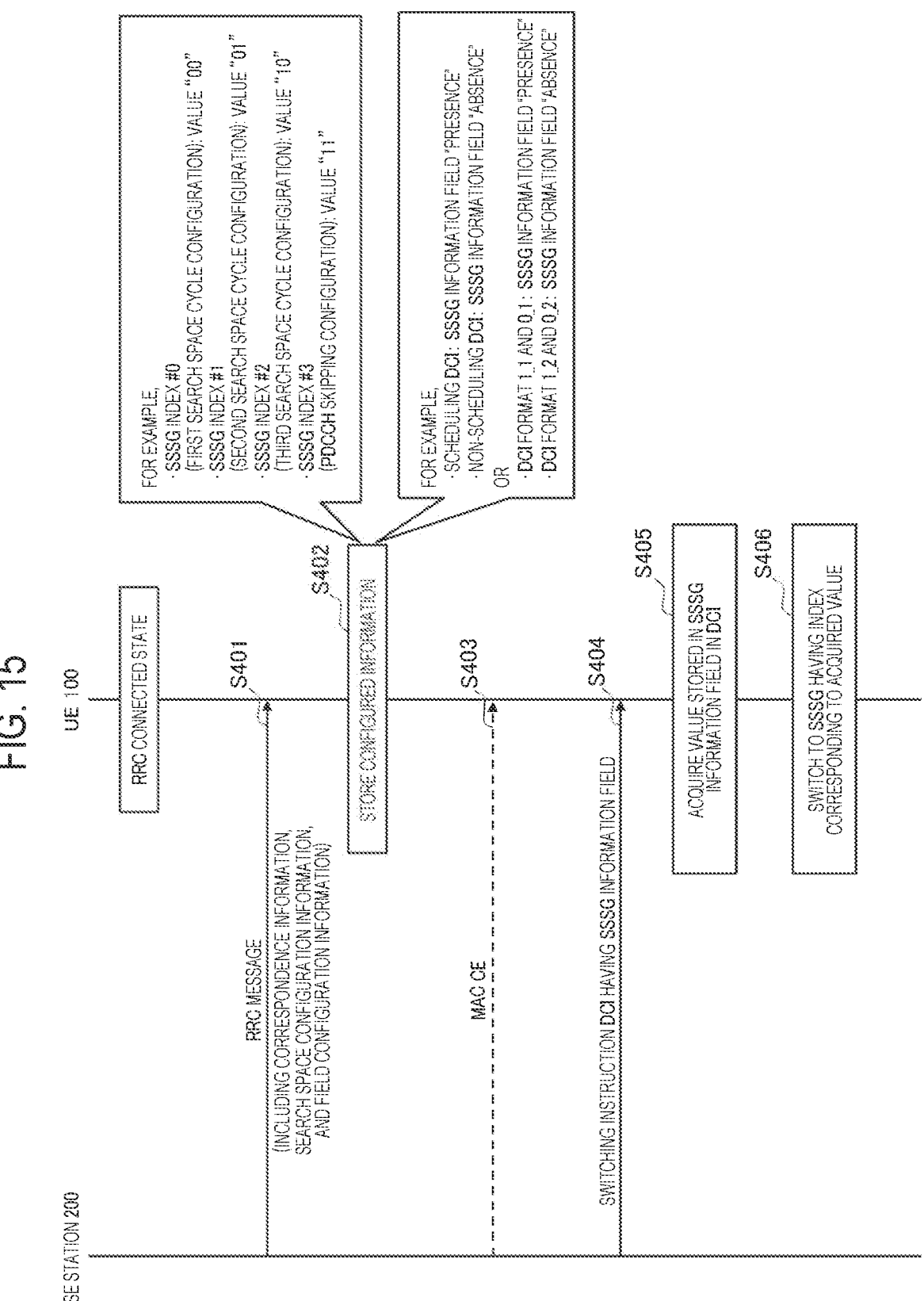
FIG. 15 is a diagram illustrating an operation according to a fourth embodiment.

As illustrated in FIG. 15, in step S401, the base station 200 (communicator 210) transmits one or a plurality of RRC messages to the UE 100. The one or the plurality of RRC messages may include dedicated RRC messages (for example, RRCReconfiguration messages) transmitted individually for UEs. The UE 100 (communicator 110) receives the RRC message.

The RRC message includes correspondence relationship information indicating a correspondence relationship between an index of each of one or the plurality of SSSGs configured in the UE 100 and a value set in an information field (hereinafter referred to as an "SSSG information field") in a switching instruction DCI instructing switching of the SSSG applied by the UE 100. The one or the plurality of SSSGs include at least one of the SSSG that periodically monitors the PDCCH and the SSSG that skips monitoring of the PDCCH.

For example, when four SSSGs are configured in the UE 100, the correspondence relationship information includes information such as "an SSSG index #0: value "00"", "an SSSG index #1: value "01"", "an SSSG index #2: value "10"", and "an SSSG index #3: value "11"". The base station 200 is not limited to collectively configuring these four SSSGs in the UE 100, and may configure the four SSSGs in the UE 100, for example, by dividing the four SSSGs twice to obtain two SSSGs each. It is noted that the value set in the SSSG information field may be configured in a bitmap format. For example, a position (a code point) of a bit, which is "1", may be associated with an SSSG index, such as "an SSSG index #0: value "1000"", "an SSSG index #1: value "0100"", "an SSSG index #2: value "0010"", and "an SSSG index #3: value "0001"".

The RRC message further includes search space configuration information associated with each of the SSSG indexes. The search space configuration information includes one or a plurality of search space configurations. Each search space configuration includes a search space period, a search space offset, a search space duration (for example, the number of consecutive slots), a symbol for PDCCH monitoring, an aggregation level, a type of search space, a DCI format, and the like.

For example, search space configuration information associated with the SSSG index #0 is information for configuring a first search space period as a search space period. Search space configuration information associated with the SSSG index #1 is information for configuring a second search space period as a search space period. Search space configuration information associated with the SSSG index #2 is information for configuring a third search space period as a search space period. Search space configuration information associated with an SSSG index #4 is information indicating that no search space is configured. That is, the SSSG index #4 is associated with search space configuration information indicating PDCCH skipping.

The RRC message may include field configuration information indicating the presence or absence of an SSSG information field for each of one or a plurality of DCI formats. The switching instruction DCI is an DCI having a DCI format in which the presence of the SSSG information field is indicated by the field configuration information. The presence/absence of the SSSG information field may be configured for the non-scheduling DCI and/or the scheduling DCI in common or independently. The presence/absence of the SSSG information field may be configured in common for the DCI format 1_1 and the DCI format 0_1 and in common for the DCI format 1_2 and the DCI format 0_2.

The RRC message may include number-of-bits configuration information indicating the number of bits of the SSSG information field for each one or a plurality of DCI formats. For the non-scheduling DCI and/or the scheduling DCI, the number of bits of the SSSG information field may be directly configured in common or independently. The number of bits of the SSSG information field may be configured in common for the DCI format 1_1 and the DCI format 0_1 and/or in common for the DCI format 1_2 and the DCI format 0_2. For example, the SSSG information field of up to two bits may be configured for the DCI format 1_1 and/or the DCI format 0_1 and/or one-bit SSSG information field may be configured for the DCI format 1_2 and the DCI format 0_2.

The RRC message may include a timer configuration value of a switching timer for one or the plurality of SSSGs. Details of such a switching timer will be described in the fifth embodiment to be described later.

In step S402, the UE 100 (controller 120) stores the information configured from the base station 200.

In step S403, the base station 200 (communicator 210) may transmit, to the UE 100, a MAC control element (CE) that designates activation or deactivation of the SSSG for each SSSG index (hereinafter, referred to as "SSSG state select MAC CE"). The UE 100 (communicator 110) receives the SSSG state select MAC CE. The SSSG state select MAC CE is to give an instruction about the activation or deactivation for each SSSG index. The activated SSSG enters a valid state as the SSSG as the switching destination, and the deactivated SSSG enters an invalid state as the SSSG as the switching destination. However, the deactivation may be prohibited for the default SSSG. The default SSSG will be described in the fifth embodiment to be described later.

For example, the SSSG state selection MAC CE is identified by a MAC subheader with an LCID defined for the SSSG state selection MAC CE. The SSSG state selection MAC CE may include a "cell ID field" indicating a serving cell to which the SSSG state selection MAC CE is applied. The SSSG state selection MAC CE may include a "Ti field" indicating activation/deactivation for each entry "i" of an SSSG index list consisting of SSSG indexes. The "Ti field" includes a "T0 field" to a "T(n−1) field", and a value "1" is set for the SSSG to be enabled. Here, "n" indicates the maximum number of SSSGs that can be activated, for example, "4". Assuming that the SSSG index #0 is activated, the SSSG index #1 is deactivated, the SSSG index #2 is activated, and the SSSG index #3 is deactivated, the "T0 field" is set to "1", the "T1 field" is set to "0", the "T2 field" is set to "1", and the "T3 field" is set to "1".

The SSSG information field may be configured in a bitmap form only for the activated SSSG. For example, the first enabled SSSG is mapped to a code point 1 of the SSSG information field, and the second enabled SSSG is mapped to a code point 2 of the SSSG information field. Assuming a case of activating the SSSG index #0, deactivating the SSSG index #1, activating the SSSG index #2, and deactivating the SSSG index #3, the number of bits of the SSSG information field is "2", where "10" indicates the SSSG index #0, and "01" indicates the SSSG index #2.

In step S404, the base station 200 (the communicator 210) transmits a switching instruction DCI having the SSSG information field to the UE 100 on the PDCCH. The UE 100 (the communicator 110) receives the switching instruction DCI on the PDCCH. The UE 100 (the controller 120) may determine whether the DCI format of the detected DCI corresponds to the switching instruction DCI based on the field configuration information configured from the base station 200.

In step S405, the UE 100 (the controller 120) acquires a value set in the SSSG information field of the switching instruction DCI received in step S404. The UE 100 (the controller 120) may acquire the value set in the SSSG information field after specifying the number of bits of the SSSG information field based on the number-of-bits configuration information configured from the base station 200. Alternatively, the UE 100 (the controller 120) may specify the number of bits of the SSSG information field based on the number of SSSG indexes (that is, the number of entries of the configured SSSG index list) configured in the UE 100 and then acquire the value set in the SSSG information field. For example, when the number of SSSG indexes configured in the UE 100 is "I", the UE 100 (the controller 120) may calculate and specify the number of bits of the SSSG information field using an integer value obtained by rounding up a decimal point of $\log_2$ (I).

In step S406, the UE 100 (the controller 120) performs switching to the SSSG having the SSSG index corresponding to the value set in the SSSG information field in the received switching instruction DCI based on the correspondence relationship information configured from the base station 200, and monitors the PDCCH according to the SSSG serving as the switching destination. For example, in the example of FIG. 13, when the value set in the SSSG information field is "11", the UE 100 (the controller 120) determines that the switching to the SSSG having the SSSG index #3 is instructed, and performs the switching to the SSSG having the SSSG index #3.

Next, a first configuration example of an information element included in the RRC message in the fourth embodiment will be described with reference to FIGS. 16 and 17.

As illustrated in FIG. 16, the RRC message includes a PDCCH configuration (PDCCH-Config) information element. This information element is an information element used to configure the control resource set (CORESET), the search space, and a UE-specific PDCCH parameter such as an additional parameter for obtaining a PDCCH.

The PDCCH configuration (PDCCH-Config) information element can include an SSSG addition and modification list (searchSpaceSetToAddModList) and/or an SSSG release list (searchSpaceSetToReleaseList). The SSSG addition and modification list is a list (SEQUENCE (SIZE (1 . . . maxNrofSearchSpaceSets-r17)) OF SearchSpaceSet-r17) of SSSGs configured to the UE 100. The SSSG release list is a list (SEQUENCE (SIZE (1 . . . maxNrofSearchSpaceSets-r17)) OF SearchSpaceSet-r17) of SSSGs to be unconfigured to the UE 100. Here, "maxNrofSearchSpaceSets-r17" indicates the maximum number of configurable SSSGs.

As illustrated in FIG. 17, "SearchSpaceSet-r17" constituting each entry of the SSSG addition and modification list and the SSSG release list includes "SearchSpaceSetId-r17" which is an index of the SSSG and "searcSpaces-r17" which is each search space configuration included in the SSSG. "searcSpaces-r17" is constituted by a list (SEQUENCE (SIZE (0 . . . maxNrofSearchSpaces-r17)) OF SearchspaceId) of search space IDs of search space configurations included in the SSSG. "SearchSpaceSetId-r17" which is an index of the SSSG has a bit number of "0 . . . maxNrofSearchSpaceSets-1-r17".

Next, a second configuration example of the information element included in the RRC message in the fourth embodiment will be described with reference to FIGS. 18 and 19.

The second configuration example indicates the SSSG to which the search space configuration belongs in each search space configuration.

As illustrated in FIG. 18, the PDCCH configuration (PDCCH-Config) information element can include a search space addition and modification list (searchSpacesToAddModListExt2-r17). The search space addition and modification list is a list including "SearchSpaceExt2-r17" of 1 to 10.

As illustrated in FIG. 19, the search space configuration (SearchSpace) information element includes "searchSpaceSetIdList-r17" which is a list of indexes of the SSSGs with which the search space configuration is associated. One search space configuration can be associated with multiple SSSGs. For SSSGs that are not associated with any of the search space configurations configured to the UE 100, the UE 100 does not monitor the PDCCH while using the SSSGs.

As described above, according to the fourth embodiment, correspondence information indicating a correspondence between the SSSG index of each of one or the plurality of SSSGs configured to the UE 100 and the value set in the SSSG information field in the switching instruction DCI for giving the instruction about the switching of the SSSG to be applied by the UE 100 is received from the base station 200. The one or plurality of SSSGs include at least one of an SSSG that periodically monitors the PDCCH and an SSSG that skips monitoring the PDCCH. Accordingly, flexible power saving to be realized by using various SSSGs. In addition, since one piece of SSSG information field provided in the switching instruction DCI can designate any one of a plurality of SSSGs having different search space periodicities or designate an SSSG that does not monitor the PDCCH, it is possible to suppress an increase in a size of the DCI even in a case where various SSSGs are used.

Fifth Embodiment

Next, the fifth embodiment will be described with reference to FIG. 20. In the fifth embodiment, it is assumed that three or more SSSGs can be configured to the UE 100 in a case where the UE 100 switches the SSSG on a timer basis.

In the fifth embodiment, the base station 200 (controller 230) may configure, to the UE 100, one of the SSSGs configured to the UE 100 as the default SSSG. For example, the base station 200 (controller 230) may designate, as "defaultSSSG-Id", one of the SSSG indexes configured to the UE 100. The default SSSG may be an SSSG determined by a predetermined rule shared in advance by the base station 200 and the UE 100 among the SSSGs configured to the UE 100. The default SSSG may be the SSSG, as the default SSSG, configured by the base station 200 for the UE 100.

Figure 20:
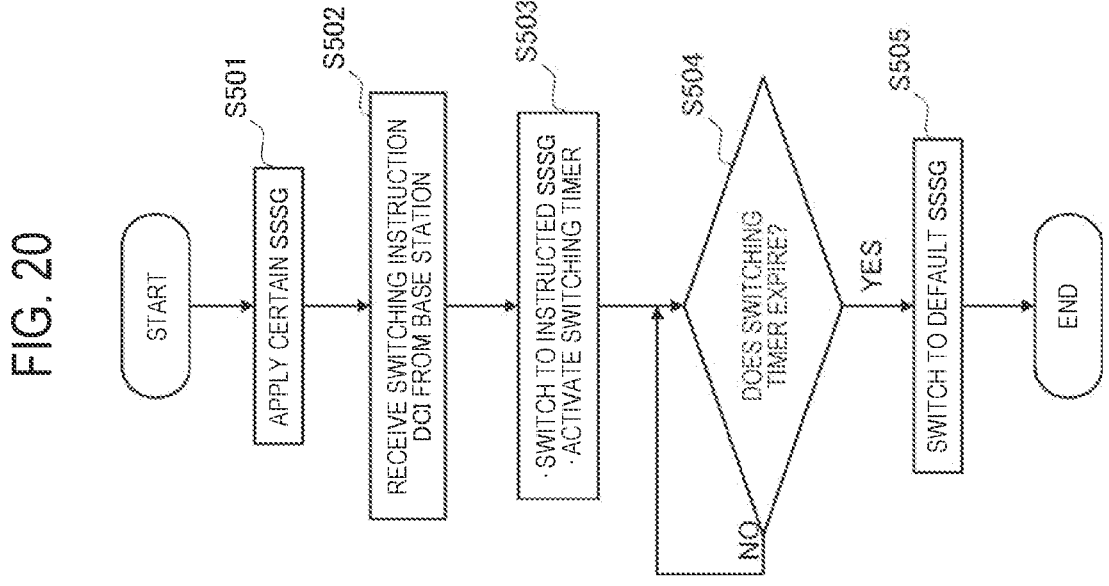
FIG. 20 is a diagram illustrating an operation according to a fifth embodiment.

As illustrated in FIG. 20, in step S501, the UE 100 (controller 120) to which the plurality of SSSGs are configured by the base station 200 monitors the PDCCH by using one SSSG among the plurality of SSSGs.

In step S502, the UE 100 (the communicator 110) receives, from the base station 200, a switching instruction DCI instructing switching to another SSSG on the PDCCH.

In step S503, the UE 100 (the controller 120) performs the switching to an SSSG designated by the switching instruction DCI and starts a timer (a switching timer) associated with the SSSG.

In step S504, the UE 100 (the controller 120) determines whether the switching timer expires.

When the switching timer expires (step S504: YES), in step S505, the UE 100 (the controller 120) switches to a default SSSG among the plurality of configured SSSGs. Here, by switching to the SSSG designated as the "default-SSSG-Id" from the base station 200, the base station 200 can grasp the SSSG serving as the switching destination of the UE 100. Since the switching timer is a value set by the base station 200, the base station 200 manages the switching timer similarly to the UE 100, and can grasp that the switching timer has expired in the UE 100.

The UE 100 (the controller 120) determines the default SSSG according to a predetermined rule when the default SSSG is not configured by the base station 200, more specifically, when the default SSSG is not explicitly designated by the base station 200 as the "defaultSSSG-Id". The predetermined rule is, for example, a rule defined in the technical specification of 3GPP, and is a rule shared in advance by the base station 200 and the UE 100.

Here, the predetermined rule may be a rule that determines, as a default SSSG, an SSSG corresponding to an SSSG index having the smallest value or an SSSG corresponding to an SSSG index having the largest value among the SSSG indexes configured in the UE 100. For example, in the example of FIG. 13, in the case of a rule in which the SSSG corresponding to the SSSG index having the smallest value is defined as the default SSSG, the UE 100 (the controller 120) determines the SSSG of the SSSG index #0 as the default SSSG. In the case of a rule in which the SSSG corresponding to the SSSG index having the largest value is defined as the default SSSG, the UE 100 (the controller 120) determines the SSSG of the SSSG index #4 as the default SSSG.

As described above, the UE 100 (the communicator 110) may receive, from the base station 200, correspondence relationship information indicating a correspondence relationship between the SSSG index configured in the UE 100 and the value set in the SSSG information field in the switching instruction DCI. The predetermined rule may be a rule that determines, as a default SSSG, an SSSG corresponding to an SSSG index indicated by a specific value (for example, "0") as a value to be set in the SSSG information field in the switching instruction DCI. For example, the UE 100 (the controller 120) determines, as a default SSSG, an SSSG having an SSSG index whose value set in the SSSG information field in the switching instruction DCI is indicated by "0".

The predetermined rule may be a rule that determines, as a default SSSG, an SSSG corresponding to an SSSG index (for example, an index #0) having a predetermined value among the SSSG indexes configured in the UE 100.

The predetermined rule may be a rule that determines, as a default SSSG, an SSSG other than the SSSG for which monitoring of the PDCCH is skipped among the SSSGs configured in the UE 100. That is, the UE 100 (the controller 120) may assume that an SSSG index corresponding to PDCCH skipping is not configured as a default SSSG.

In a case where DRX is configured in the UE 100, the UE 100 (the controller 120) may apply a specific SSSG when switching is performed from a reception-off period of the DRX to a reception-on period thereof (active time). The predetermined rule may be a rule that determines the specific SSSG as a default SSSG. That is, the UE 100 (the controller 120) may determine, as a default SSSG, the first SSSG for monitoring the PDCCH after the reception-off period of the DRX has elapsed.

In the fifth embodiment, the UE 100 (communicator 110) may receive, as the switching instruction DCI, the scheduling DCI indicating the radio resource allocated to the UE 100. After the scheduling DCI is received as the switching instruction DCI, the UE 100 (controller 120) may activate the switching timer at a timing at which switching to one SSSG is performed (specifically, a slot in which the SSSG switching is executed). As described in the second embodiment, the UE 100 (controller 120) can suspend the SSSG switching while the retransmission related timer related to the HARQ processing is operating. Thus, in a case where the scheduling DCI is received as the switching instruction DCI, the switching timer is activated not at a timing at which the switching instruction DCI is received but at a timing at which the SSSG switching is performed.

The UE 100 (controller 120) may use a common value as a value of the switching timer applied to two or more SSSGs among three or more SSSGs configured to the UE 100. The base station 200 (controller 230) may configure the common value as the value of the switching timer applied to two or more SSSGs among three or more SSSGs configured to the UE 100.

The UE 100 (controller 120) may use a dedicated value for each SSSG as the value of the switching timer applied to each of the SSSGs configured to the UE 100. The base station 200 (controller 230) may configure, to the UE 100, a dedicated switching timer configuration value for each SSSG.

In a case where the SSSG of the switching destination is the SSSG corresponding to the PDCCH skipping, the UE 100 (controller 120) may activate the switching timer associated with the SSSG at a timing (slot) of starting the switching to the SSSG. In the case of the PDCCH skipping state, that is, in a predetermined period during which the monitoring of the PDCCH is skipped, a resource used for monitoring the PDCCH is not occupied, and the switching to the SSSG can be started at any timing. This advantage is utilized, and thus, it is possible to minimize the influence of the switching delay time without hindering the operation of monitoring the PDCCH. Note that the UE 100 (controller 120) may monitor the PDDCH by assuming the default SSSG after the switching timer expires.

Next, Specific Example 1 of the operation using the switching timer according to the fifth embodiment will be described with reference to FIG. 21.

Figure 21:
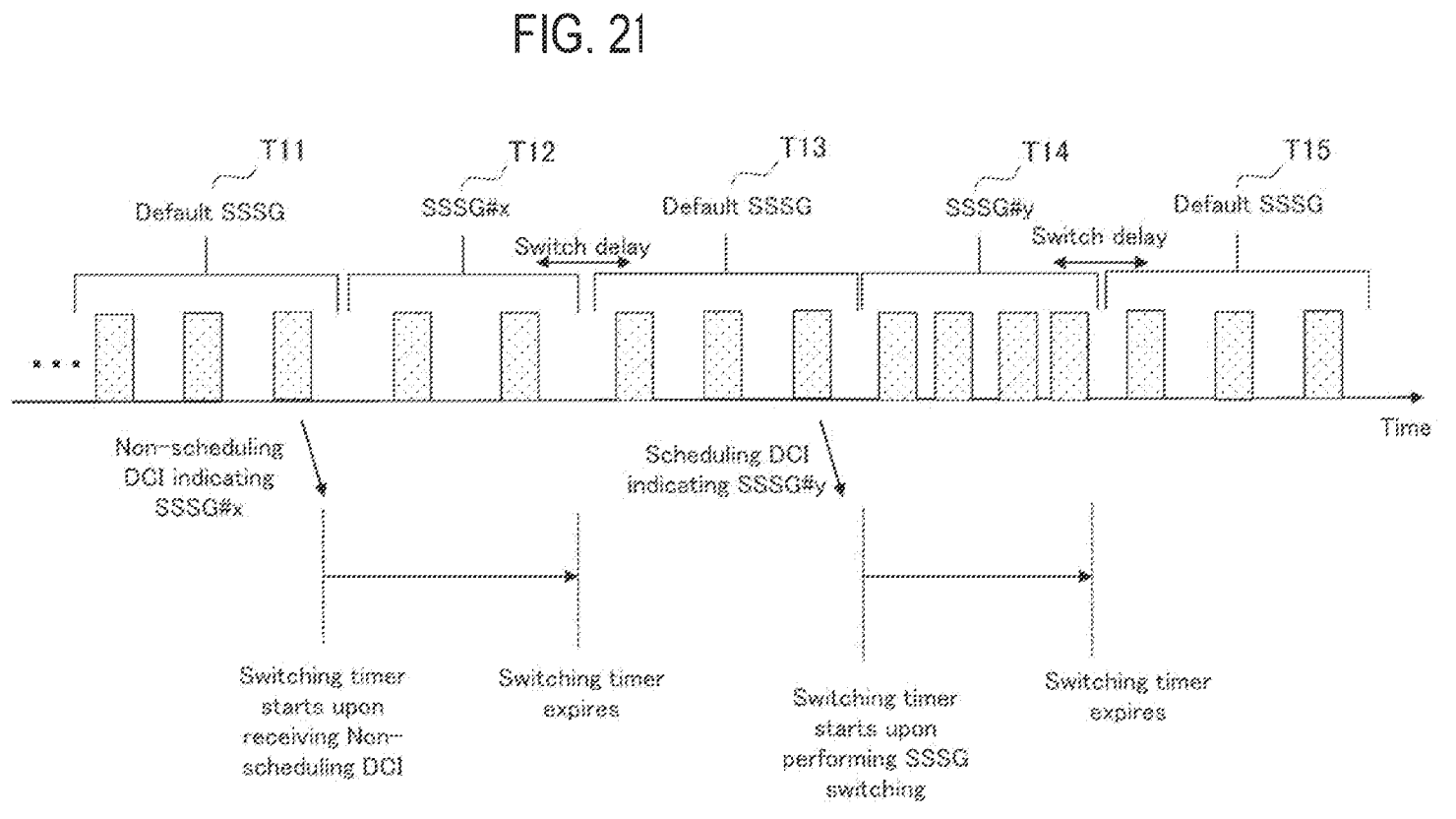

As illustrated in FIG. 21, a total of three SSSGs which are a default SSSG (Default SSSG), SSSG #x, and SSSG #y are configured to the UE 100. Here, it is assumed that the base station 200 (controller 230) configures, to the UE 100, one common switching timer value for SSSG #x and SSSG #y that are not the default SSSG.

In a period T11, the UE 100 (the controller 120) monitors the PDCCH using the default SSSG. The UE 100 (the communicator 110) receives a non-scheduling DCI instructing switching to the SSSG #x in the last search space of the period T11. Since HARQ processing does not occur in the case of the non-scheduling DCI, the UE 100 (the controller 120) starts a switching timer when the non-scheduling DCI is received.

In a period T12, the UE 100 (the controller 120) monitors the PDCCH using the SSSG #x while the switching timer is in operation. The SSSG #x is an SSSG having a longer search space period than the default SSSG. When the switching timer expires, the UE 100 (the controller 120) switches to the default SSSG after a switching delay time (switch delay) has elapsed.

In a period T13, the UE 100 (the controller 120) monitors the PDCCH using the default SSSG. The UE 100 (the communicator 110) receives a scheduling DCI instructing switching to the SSSG #y in the last search space of the period T13. Since HARQ processing occurs in the case of the scheduling DCI, the UE 100 (the controller 120) does not start the switching timer at the time of receiving the scheduling DCI, and starts the switching timer at the timing (the slot) when the switching to the SSSG #y is executed.

In a period T14, the UE 100 (the controller 120) monitors the PDCCH using the SSSG #y while the switching timer is in operation. The SSSG #y is an SSSG having a shorter search space period than the default SSSG. When the switching timer expires, the UE 100 (the controller 120) switches to the default SSSG after a switching delay time (switch delay) has elapsed. Then, in a period T15, the UE 100 (the controller 120) monitors the PDCCH using the default SSSG.

Next, Specific Example 2 of the operation using the switching timer according to the fifth embodiment will be described with reference to FIG. 22.

Figure 22:
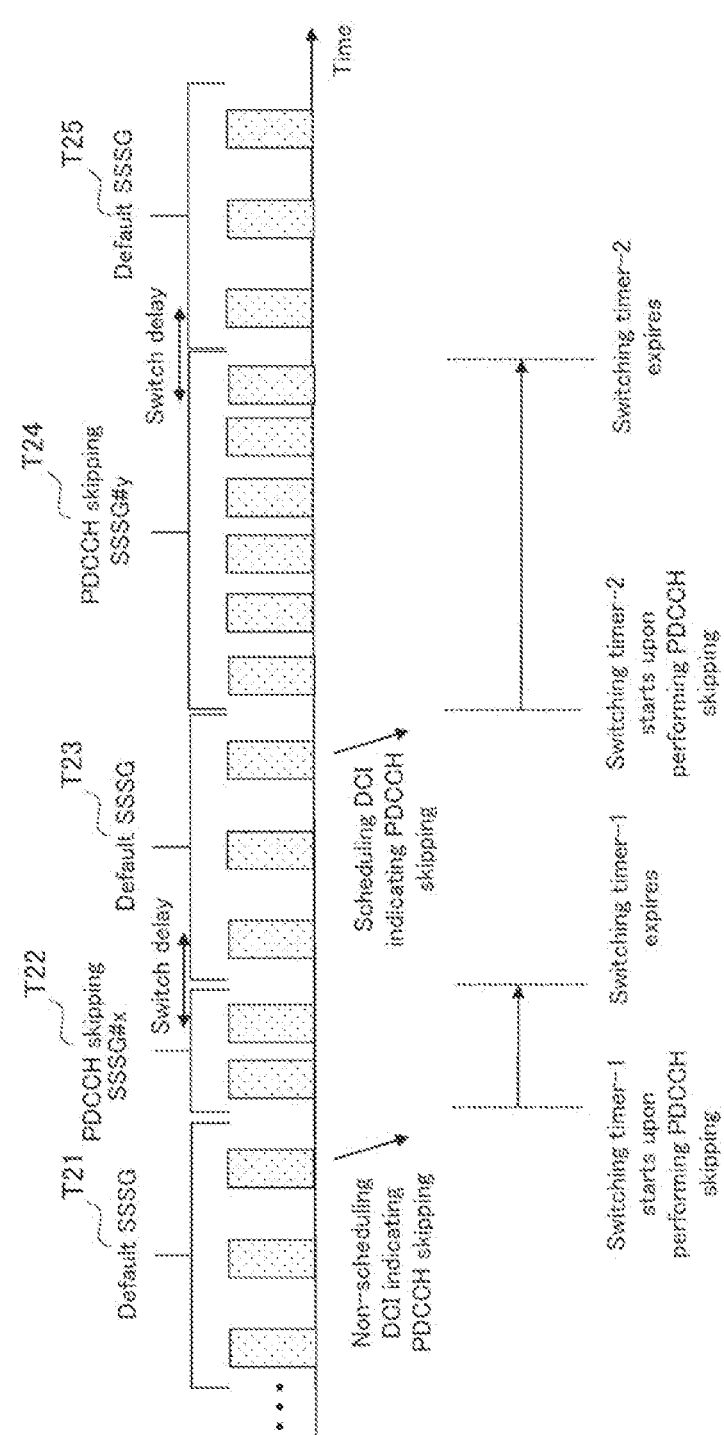
FIG. 22 is a diagram illustrating Specific Example 2 of the operation using the switching timer according to the fifth embodiment.

As illustrated in FIG. 22, a total of three SSSGs including a default SSSG (Default SSSG), SSSG #x for PDCCH skipping, and SSSG #y for PDCCH skipping are configured to the UE 100. Here, it is assumed that the base station 200 (controller 230) configures, to the UE 100, dedicated switching timer values for SSSG #x and SSSG #y that are not the default SSSG.

In a period T21, the UE 100 (the controller 120) monitors the PDCCH using the default SSSG. The UE 100 (the communicator 110) receives a non-scheduling DCI instructing switching to the SSSG #x in the last search space of the period T11. Since the SSSG #x serving as a switching destination is an SSSG corresponding to the PDCCH skipping, the UE 100 (the controller 120) starts a switching timer (a switching timer-1) independently configured for the SSSG #x at a timing (a slot) when the switching to the SSSG #x is executed.

In a period T22, the UE 100 (the controller 120) skips monitoring of the PDCCH while the switching timer-1 is in operation. When the switching timer-1 expires, the UE 100 (the controller 120) switches to the default SSSG after a switching delay time (switch delay) has elapsed.

In a period T23, the UE 100 (the controller 120) monitors the PDCCH using the default SSSG. The UE 100 (the communicator 110) receives a scheduling DCI instructing switching to the SSSG #y in the last search space of the period T23. Since the SSSG #x serving as the switching destination is the SSSG corresponding to the PDCCH skipping, the UE 100 (the controller 120) starts a switching timer (a switching timer-2) independently configured for the SSSG #y at a timing (a slot) when the switching to the SSSG #y is executed. A timer value of the switching timer-2 is larger than the timer value of the switching timer-1.

In a period T24, the UE 100 (the controller 120) skips monitoring of the PDCCH while the switching timer-2 is in operation. When the switching timer-2 expires, the UE 100 (the controller 120) switches to the default SSSG after a switching delay time (switch delay) has elapsed. Then, in a period T25, the UE 100 (the controller 120) monitors the PDCCH using the default SSSG.

As described above, according to the fifth embodiment, even in a case where the UE 100 switches the SSSG on the timer basis, and three or more SSSGs can be configured to the UE 100, the base station 200 can grasp the SSSG as the switching destination by defining the default SSSG. Thus, it is possible to perform switching on the timer basis for various SSSGs.

OTHER EMBODIMENTS

In the above-described embodiments, the base station 200 may include a plurality of units. The plurality of units may include a first unit that hosts a higher layer included in a protocol stack and a second unit that hosts a lower layer included in the protocol stack. The higher layer may include an RRC layer, an SDAP layer, and a PDCP layer, and the lower layer may include an RLC layer, a MAC layer, and a PHY layer. The first unit may be a central unit (CU), and the second unit may be a distributed unit (DU). The plurality of units may include a third unit that performs processing of a lower layer of the PHY layer. The second unit may perform processing of a higher layer of the PHY layer. The third unit may be a radio unit (RU). The base station 200 may be one of the plurality of units, and may be connected to another unit of the plurality of units. In addition, the base station 200 may be an integrated access and backhaul (IAB) donor or an IAB node.

In the above-described embodiments, a mobile communication system based on NR has been described as an example of a mobile communication system 1. However, the mobile communication system 1 is not limited to this example. The mobile communication system 1 may be a system conforming to TS of any of LTE or another generation system (for example, sixth generation) of the 3GPP standard. The base station 200 may be an eNB that provides protocol terminations of an E-UTRA user plane and a control plane toward the UE 100 in LTE. The mobile communication system 1 may be a system conforming to TS having a standard other than the 3GPP standard. Similarly, a mobile communication system to which carrier aggregation is applied has been described as an example. However, the mobile communication system is not limited to the mobile communication system to which the carrier aggregation is applied, and may be a mobile communication system to which dual connectivity is applied. In addition, the operation example using the primary cell (PCell) may be an operation using a special cell (SpCell).

The steps in the operation of the above-described embodiment may not necessarily be execute in chronological order according to the order described in the flow diagram or sequence diagram. For example, the steps in the operation may be performed in an order different from the order described as the flow diagram or sequence diagram, or may be performed in parallel. In addition, some of the steps in the operation may be removed and additional steps may be added to the processing. Furthermore, each operation flow described above is not necessarily implemented separately and independently and a combination of two or more operation flows can be implemented. For example, some steps of one operation flow may be added to another operation flow, or some steps of one operation flow may be replaced with some steps of another operation flow.

A program for causing a computer to execute each processing performed by the UE 100 or the base station 200 may be provided. The program may be recorded on a computer readable medium. The computer readable medium is used, and thus, the program can be installed in the computer. Here, the computer readable medium on which the program is recorded may be a non-transitory recording medium. The non-transitory recording medium is not particularly limited, but may be, for example, a recording medium such as a CD-ROM or a DVD-ROM. In addition, a circuit that executes each processing performed by the UE 100 or the base station 200 may be integrated, and at least a part of the UE 100 or the base station 200 may be a semiconductor integrated circuit (chipset, SoC (system-on-a-chip)).

In the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "obtain/acquire" may mean to obtain/acquire information from stored information. In addition, "obtain/acquire" may mean to obtain/acquire information from information received from another node. Alternatively, "obtain/acquire" may mean to obtain/acquire information by generating the information. Similarly, "include" and "comprise" do not mean to include only the listed items, but may include only the listed items. Further, "include" and "comprise" mean that additional items may be included in addition to the listed items. Similarly, in the present disclosure, "or" does not mean exclusive OR but means OR.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

Features of the present disclosure will be described below.

APPENDIX 1

A user equipment (100) to which a plurality of cell groups are configured by a base station (200), comprising:
a communicator (110) configured to receive a switching instruction for giving an instruction about switching of search space set groups (SSSGs) in serving cells belonging to any cell group of the plurality of cell groups from the base station (200); and
a controller (120) configured to specify a target cell group as a switching target of the SSSG from among the plurality of cell groups based on a cell identifier or a cell group identifier included in the switching instruction, wherein
the controller (120) is configured to simultaneously switch the SSSGs of all the serving cells in the specified target cell group in response to the reception of the switching instruction.

APPENDIX 2

The user equipment (100) according to appendix 1, wherein
the switching instruction is an SSSG switching medium access control (MAC) control element (CE) for giving the instruction about the switching of the SSSG.

APPENDIX 3

The user equipment (100) according to appendix 2, wherein
the SSSG switching MAC CE includes the cell identifier of one serving cell included in the target cell group, and the controller (120) is configured to specify, as the target cell group, a cell group to which a serving cell indicated by the cell identifier included in the SSSG switching MAC CE belongs.

APPENDIX 4

The user equipment (100) according to appendix 2 or 3, wherein
the SSSG switching MAC CE further includes an SSSG identifier indicating an SSSG as a switching destination, and
the controller (120) is configured to perform switching to the SSSG as the switching destination indicated by the SSSG identifier for all the serving cells in the target cell group.

APPENDIX 5

The user equipment (100) according to any one of appendixes 2 to 4, wherein
the SSSG switching MAC CE further includes a bandwidth part (BWP) identifier indicating a BWP to which the target cell group belongs.

APPENDIX 6

The user equipment (100) according to appendix 1, wherein
the switching instruction is SSSG switching downlink control information (DCI) for giving the instruction about the switching of the SSSG.

APPENDIX 7

The user equipment (100) according to appendix 6, wherein
the SSSG switching DCI is scheduling DCI used for scheduling a physical uplink control channel (PUSCH) or scheduling a physical downlink control channel (PDSCH).

APPENDIX 8

The user equipment (100) according to appendix 6, wherein
the SSSG switching DCI is non-scheduling DCI not used for scheduling a physical uplink control channel (PUSCH) or scheduling a physical downlink control channel (PDSCH).

APPENDIX 9

A base station (200) that configures a plurality of cell groups to a user equipment (100), comprising:
a communicator (210) configured to transmit, to the user equipment (100), a switching instruction for giving an instruction about switching of search space set groups (SSSGs) in serving cells belonging to any cell group of the plurality of cell groups, wherein
the communicator (210) is configured to transmit the switching instruction including a cell group identifier of a target cell group as a switching target of the SSSG among the plurality of cell groups or a cell identifier of a serving cell belonging to the target cell group.

APPENDIX 10

A communication control method executed by a user equipment (100) to which a plurality of cell groups are configured by a base station (200), comprising the steps of:
receiving a switching instruction for giving an instruction about switching of search space set groups (SSSGs) in serving cells belonging to any cell group of the plurality of cell groups from the base station (200);
specifying a target cell group as a switching target of the SSSG from among the plurality of cell groups based on a cell identifier or a cell group identifier included in the switching instruction; and
simultaneously switching the SSSGs of all the serving cells in the target cell group specified from among the plurality of cell groups in response to the reception of the switching instruction.

The invention claimed is:

1. A communication apparatus comprising:
a receiver configured to receive, from a base station, a radio resource control (RRC) message including configurations for one or more search space sets and a configuration for a value of switching delay, wherein each of the configurations for the one or more search space sets includes information indicating which of a first search space set group identified by a group index "0", a second search space set group identified by a group index "1", and a third search space set group identified by a group index "2", each of the configurations for the one or more search space sets is associated with, and
a controller configured to control, based on a value of information field included in downlink control information (DCI), physical downlink control channel (PDCCH) monitoring in a downlink bandwidth part (BWP) of a serving cell, the DCI being used for scheduling of a physical downlink shared channel (PDSCH) or a physical uplink shared channel (PUSCH), wherein:
the controller is configured to:
start, based on the configuration for the value of the switching delay, the PDCCH monitoring according to the first search space set group in a case that the PDCCH monitoring according to the second search space set group is performed and a timer of a timer value expires, and
start, based on the configuration for the value of the switching delay, the PDCCH monitoring according to the first search space set group in a case that the PDCCH monitoring according to the third search space set group is performed and the timer of the timer value expires.

2. The communication apparatus according to claim 1, wherein;
the receiver is configured to receive, from the base station, the RRC message including a configuration for the timer value.

3. The communication apparatus according to claim 1, wherein;
CRC parity bits scrambled by one of a cell-radio network temporary identifier (C-RNTI), a modulation and coding scheme-C-RNTI (MCS-C-RNTI), and a configured scheduling-RNTI (CS-RNTI) is attached to the DCI.

4. A base station comprising:
a transmitter configured to transmit, to a communication apparatus, a radio resource control (RRC) message including configurations for one or more search space sets and a configuration for a value of switching delay, wherein each of the configurations for the one or more search space sets includes information indicating which of a first search space set group identified by a group index "0", a second search space set group identified by a group index "1", and a third search space set group identified by a group index "2", each of the configurations for the one or more search space sets is associated with, and
a controller configured to control, based on a value of information field included in downlink control information (DCI), for the communication apparatus to perform physical downlink control channel (PDCCH) monitoring in a downlink bandwidth part (BWP) of a serving cell, the DCI being used for scheduling of a physical downlink shared channel (PDSCH) or a physical uplink shared channel (PUSCH), wherein:
the PDCCH monitoring according to the first search space set group is started based on the configuration for the value of the switching delay in a case that the PDCCH monitoring according to the second search space set group is indicated and a timer of a timer value expires, and
the PDCCH monitoring according to the first search space set group is started based on the configuration for the value of the switching delay in a case that the PDCCH monitoring according to the third search space set group is indicated and the timer of the timer value expires.

5. The base station according to claim 4, wherein;
the transmitter is configured to transmit, to the communication apparatus, the RRC message including a configuration for the timer value.

6. The base station according to claim 4, wherein
CRC parity bits scrambled by one of a cell-radio network temporary identifier (C-RNTI), a modulation and coding scheme-C-RNTI (MCS-C-RNTI), and a configured scheduling-RNTI (CS-RNTI) is attached to the DCI.

7. A communication method performed by a communication apparatus, the communication method comprising:
receiving, from a base station, a radio resource control (RRC) message including configurations for one or more search space sets and a configuration for a value of switching delay, wherein each of the configurations for the one or more search space sets includes information indicating which of a first search space set group identified by a group index "0", a second search space set group identified by a group index "1", and a third search space set group identified by a group index "2", each of the configurations for the one or more search space set group is associated with;
controlling, based on a value of information field included in downlink control information (DCI), physical downlink control channel (PDCCH) monitoring in a downlink bandwidth part (BWP) of a serving cell, the DCI being used for scheduling of a physical downlink shared channel (PDSCH) or a physical uplink shared channel (PUSCH);
starting, based on the configuration for the value of the switching delay, the PDCCH monitoring according to the first search space set group in a case that the PDCCH monitoring according to the second search space set group is performed and a timer of a timer value expires; and
starting, based on the configuration for the value of the switching delay, the PDCCH monitoring according to the first search space set group in a case that the PDCCH monitoring according to the third search space set group is performed and the timer of the timer value expires.

8. The communication method according to claim 7, further comprising:

receiving, from the base station, the RRC message including a configuration for the timer value.

9. The communication method according to claim 7, wherein;

CRC parity bits scrambled by one of a cell-radio network temporary identifier (C-RNTI), a modulation and coding scheme-C-RNTI (MCS-C-RNTI), and a configured scheduling-RNTI (CS-RNTI) is attached to the DCI.

* * * * *